(12) United States Patent
Almadi

(10) Patent No.: US 9,722,951 B2
(45) Date of Patent: Aug. 1, 2017

(54) SYSTEMS, METHODS, AND COMPUTER MEDIUM TO PROVIDE ADAPTIVE PRIORITY SCHEDULING OF COMMUNICATIONS OVER A NETWORK AND DYNAMIC RESOURCES ALLOCATION AMONG DEVICES WITHIN THE NETWORK

(71) Applicant: Saudi Arabian Oil Company, Dhahran (SA)

(72) Inventor: Soloman M. Almadi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 267 days.

(21) Appl. No.: 14/703,388

(22) Filed: May 4, 2015

(65) Prior Publication Data

US 2016/0330134 A1 Nov. 10, 2016

(51) Int. Cl.
*H04L 12/24* (2006.01)
*H04L 12/911* (2013.01)
(Continued)

(52) U.S. Cl.
CPC ............ *H04L 47/788* (2013.01); *H04L 41/12* (2013.01); *H04L 41/16* (2013.01); *H04L 45/02* (2013.01); *H04W 72/04* (2013.01)

(58) Field of Classification Search
CPC .......... H04L 41/12; H04L 45/02; H04L 45/04
See application file for complete search history.

(56) References Cited

U.S. PATENT DOCUMENTS 6,115,646 A 9/2000 Fiszman et al.
6,434,435 B1 * 8/2002 Tubel ............... E21B 34/06
166/250.15

(Continued)

FOREIGN PATENT DOCUMENTS

WO 03088067 10/2003
WO 2007103026 A2 9/2007

OTHER PUBLICATIONS

International Search Report and Written Opinion for International Application No. PCT/US2016/030669; International Filing Date May 4, 2016; Report mail date Jul. 13, 2016. (11 Pages).

(Continued)

*Primary Examiner* — Andrew Lai
*Assistant Examiner* — Zhiren Qin
(74) *Attorney, Agent, or Firm* — Bracewell LLP; Constance G. Rhebergen; Brian H. Tompkins

(57) ABSTRACT

Systems, computer-implemented methods, and non-transitory computer-readable medium having computer program stored therein can provide adaptive priority scheduling of communications over a communication network and dynamic resources allocation among a plurality of devices positioned in the communication network. A system according to an embodiment can include an automation application provisioning module (AAPM) to configure and provision relationships among automation application (AA) devices and non-AA devices; an automation application control module (AACM) to control network resources allocation responsive to the AAPM; a network infrastructure interface module (NIIM) to interface with and measure performance of the devices; a network performance analysis module (NPAM) to analyze performance of the devices and identify optimal network topologies responsive to the NIIM; and a network resources allocation platform module (NPM) to control network resources allocation responsive to the AAPM, the AACM, and the NPAM thereby to enhance coexistence of the AA and non-AA devices within the network.

27 Claims, 11 Drawing Sheets

(51) Int. Cl.
*H04W 72/04* (2009.01)
*H04L 12/751* (2013.01)

(56) References Cited

U.S. PATENT DOCUMENTS

| | | | |
|---|---|---|---|
| 6,721,615 B2 | 4/2004 | Fava et al. | |
| 7,206,643 B2 | 4/2007 | Ruutu et al. | |
| 7,370,084 B2 | 5/2008 | Dinges et al. | |
| 7,774,073 B2 | 8/2010 | Cane et al. | |
| 8,224,783 B1* | 7/2012 | Burleigh | G06Q 10/06311 707/654 |
| 8,312,320 B2 | 11/2012 | Almadi et al. | |
| 8,406,248 B2 | 3/2013 | Pratt, Jr. et al. | |
| 8,527,652 B2 | 9/2013 | Wimmer | |
| 8,533,362 B2 | 9/2013 | Alexander | |
| 8,621,637 B2 | 12/2013 | Al-Harbi et al. | |
| 8,667,091 B2 | 3/2014 | Almadi et al. | |
| 2004/0246905 A1 | 12/2004 | Dunagan et al. | |
| 2008/0147206 A1 | 6/2008 | Zahrai et al. | |
| 2009/0046732 A1* | 2/2009 | Pratt, Jr. | H04L 12/66 370/406 |
| 2009/0097415 A1* | 4/2009 | Shepard | H04W 76/023 370/254 |
| 2010/0102625 A1* | 4/2010 | Karimi | B60L 1/00 307/9.1 |
| 2013/0096727 A1* | 4/2013 | Brandt | G05B 19/4186 700/291 |
| 2013/0103749 A1* | 4/2013 | Werth | G06F 9/4446 709/203 |
| 2013/0117747 A1 | 5/2013 | Balko | |
| 2013/0211546 A1 | 8/2013 | Lawson et al. | |
| 2013/0231781 A1 | 9/2013 | Chapman | |
| 2013/0283182 A1* | 10/2013 | Dadu | H04L 67/125 715/740 |
| 2013/0329648 A1 | 12/2013 | Lord | |
| 2014/0095245 A1* | 4/2014 | Walsh | G06Q 10/06315 705/7.25 |
| 2014/0114598 A1 | 4/2014 | Almadi et al. | |
| 2014/0115121 A1 | 4/2014 | Almadi et al. | |
| 2014/0192666 A1* | 7/2014 | Zhou | H04L 67/22 370/252 |
| 2015/0063166 A1* | 3/2015 | Sif | G06F 9/45558 370/254 |

OTHER PUBLICATIONS

Stanek, Sean; "Semi-automated parallel programming in heterogeneous intelligent reconfigurable environments (Sapphire)" (2012); Graduate Theses and Dissertations; paper 12560.

Valente, et al; A methodology for static and dynamic scheduling of automation tasks in reconfigurable production systems; Oct. 9, 2012; CIRP Journal of Manufacturing Science and Technology 5 (2012) 241-253.

* cited by examiner

SYSTEMS, METHODS, AND COMPUTER MEDIUM TO PROVIDE ADAPTIVE PRIORITY SCHEDULING OF COMMUNICATIONS OVER A NETWORK AND DYNAMIC RESOURCES ALLOCATION AMONG DEVICES WITHIN THE NETWORK

BACKGROUND OF THE INVENTION

Field of the Invention

Embodiments of the invention relate to network management and, more specifically, to methods, systems, and non-transitory computer-readable medium having computer program stored therein to schedule communications and allocate resources within a network.

Description of the Related Art

Control systems, such as those used in the oil and gas, power, and utilities industries, may include multiple stand-alone automation applications (AAs), which may sometimes be described as industrial automation applications. An automation application (AA) may be associated with one or more devices that include embedded intelligence. Each AA within a control system, for example, may have standalone or generally separate network elements and computing systems. At a control system location, for instance, such multiple standalone—and often parallel—operating AAs may result in a large requirement for floor space, high power usage, and wiring duplication.

SUMMARY OF THE INVENTION

Applicant has recognized that AAs often may be managed separately from network resources allocation. That is, many different deployments of AAs today may require AAs that stand alone from network resources allocation. Moreover, Applicant has recognized that multiple applications may be used for different operations. Further, different deployments today may be based on different hardware components that require application, system, and network integration. Applicant still further has recognized that industry and the prior art have failed to integrate multiple AAs on the same network, for example. Applicant also has recognized reasons that the prior art has failed in this regard, such as a demand for high-speed bandwidth and fast switching infrastructure. Further, Applicant has recognized that generic models for automation applications may be based on cells or work-areas that create silos. Applicant also has recognized that the industry has failed to integrate multiple AAs on the same network as a result of a lack of AAs that are directly coupled to the network resource allocation to dynamically satisfy requirements of multiple AAs.

Additionally, Applicant has recognized problems with keeping deployments of AAs separate. For example, Applicant has recognized that deployments may have been kept separate for the following reasons: (1) application specialization to meet specific functions (e.g., safety versus regulatory functions); (2) a lack of technology that can manage different applications on the same network infrastructure (i.e., the risks of integrating multiple systems); and (3) delays in the open standard communication infrastructure deployment in the process automation domain (e.g., due to proprietary solutions). Advantageously, embodiments of the invention can address these and other problems, e.g., by performing activities after transforming the network model to a more general model and addressing multiple cells/work-areas that are supported by multiple applications.

Having recognized these and other problems, their sources, and solutions to the problems, for example, Applicant discloses herein embodiments of systems, computer-implemented methods, and non-transitory computer-readable medium having computer program stored therein to provide adaptive priority scheduling of communications over a communication network and dynamic resources allocation among a plurality of devices positioned in the communication network.

Embodiments of the invention can include, for example, a system and network platform for process, power, and utilities control networks for intelligent controllers in an operational environment that combines independent industrial applications onto an integrated Internet protocol (IP) based network platform. A network platform according to an embodiment can include an application logic control layer and a network logic control layer, for example. Combining and linking the two layers advantageously can result in loosely coupled systems that can be adaptive and dynamic to application and network requirements and boundaries. Additionally, embodiments can provide adaptive network links through both wired and wireless communication (e.g., a wireless network) with quality of service (QoS) for IP over Ethernet to regulate traffic mix and support timely delivery, multiple applications with multi-priority scheduling, synchronization in a local area and wide area network, synchronization between end station points and their subsystems, and network self-healing and embedded security. Further, embodiments can enable network platform networking for multi-sensor, actuator, and logic solvers networked together to form independent control system network platforms. Formation of such independent control system network platforms can be achieved, for example, by invoking priority-based adaptive scheduling with the highest priority being awarded to highest ranked control commands (e.g., open loop, closed loop, cascaded loop, and protection and safety systems) based on peer-to-peer and peer-to-multi peer schemes, among other supported services, such as monitoring, diagnostic data, and provisioning applications. Moreover, an exemplary platform can use dynamic priority allocation, scheduling, and behavior identification at the application layer that can be mapped down to the network layer and input/output (I/O) layer, for instance. That is, the dynamic priority of an application can be translated into a dynamic priority on the network layer, and the I/O layer priority can be governed by the application priority dynamic, as well. In a steady state, for example, changes can be prohibited in this priority state. At least one benefit from utilizing an integrated IP network platform can be a reduction from a number of interdependent networks to a single uniform and standard network. In addition, such an integrated infrastructure can offer a platform for additional support services, such as a unified engineering operation center, an engineering center, and operational virtualization. Such a network-based model can manifest itself to be integrated with complete control system platform capabilities that can be independent of space and time, resulting in the concept of plant and operational virtualization and multi-tier operational environments.

A platform according to an embodiment can provide data exchange for oil and gas applications, power, and utilities, among other examples. For instance, an automation application integrated IP over an Ethernet network (AA IIPoEN) platform can serve as a system and network platform for operating, connecting, and automating the infrastructure for oil and gas applications, factory operations, power substations, smart grids, utilities, and transportation operations, for example. Such an AA IIPoEN can: (1) reduce the number of parallel networks by deploying an integrated IP over an Ethernet network; (2) automate application of an AA priority dynamic to the network priority configuration; (3) support multiple applications with different interfaces on the same platform; (4) provide multi-application time synchronization capabilities with a host; and (5) reduce network node power requirements and space by minimizing the number of hardware components in the field. Embodiments of the invention thus can include an AA integrated IP over an Ethernet network (AA IIPoEN) platform for hydrocarbon process, power, utilities, and intelligent controllers and systems, for example.

Advantageously, embodiments of the invention can establish a direct link between an application logic control layer and a network logic control layer, for example. The combination and linking between the two layers can result in one or more loosely coupled systems that are adaptive and dynamic to application and network requirements, boundaries, and network resources allocations, for instance. Embodiments of the invention also can enhance capital asset utilization and minimize the number of applications and networks required, which in turn can result in a reduction in the necessary hardware, floor space, power, and wiring requirements for an entity. Additional benefits can include: (1) reducing the number of parallel networks by deploying an integrated IP over an Ethernet network; (2) automating application of an AA priority dynamic to the network priority configuration; (3) supporting multiple applications with different interfaces on the same platform; (4) providing a multi-application time synchronization capability with a host; and (5) reducing network node power requirements and space by minimizing the number of hardware components in operating facilities, for example. Consequently, embodiments of the invention can benefit, for example, an operation that depends on automation applications and networking, e.g., oil, gas, factory automation, utilities, power stations, smart grid, and transportation operations.

Embodiments of the invention advantageously can (1) focus on priority classification, scheduling, and resource allocation for both an AA and a network; (2) address the linking of end user, AAs, and network resource allocations; (3) operate independently of industrial protocols, such that AAs and a network can be independent from operating systems and a computing platform; (4) focus on application and network integration; (5) provide loose coupling between an application and a network; (6) network different operational segment local cells and wide areas; (7) focus on a control system's direct linking to networking; (8) provide application converging and an extended network for multiple AAs; (9) focus on a system and network level; (10) focus on multi-automation disciplines (e.g., oil and gas, power, utilities, etc.); and (11) provide an integrated platform that can enable integrated applications operation and networks.

Consequently, embodiments of the invention advantageously can dynamically schedule data packets from AA network-connected equipment or devices over a single, common communication network by dynamically adjusting the priority level of the network devices based on various factors, including emergency or abnormal circumstances. Such dynamic readjustment of priority level can decrease latency, increase reliability, or optimize network performance, for example. Embodiments of the invention also can recompute priority on a cyclic basis and provide adaptive priority tracking. Further, embodiments can enable an operator to override a priority assignment or order, e.g., by use of peer-to-peer/multi-peer data exchanges.

For example, an embodiment can include a system to provide adaptive priority scheduling of communications over a communication network and dynamic resources allocation among a plurality of devices positioned in the communication network. In an exemplary embodiment, a system can include one or more processors and a communication network. Further, a system can include a plurality of devices positioned in the communication network. Each of the plurality of devices can be configured to be in communication with the one or more processors and another one or more of the plurality of devices through the communication network. In addition, each of the plurality of devices also can be configured to send and receive messages through a respective input and output unit. The plurality of devices can be configured to include a plurality of devices equipped with embedded intelligence thereby to define automation application (AA) devices, for example. Additionally, the plurality of devices also can be configured to include one or more other devices that are not equipped with embedded intelligence thereby to define non-AA devices.

A system further can include non-transitory computer-readable medium positioned in communication with the one or more processors. The non-transitory computer-readable medium also can be configured to include a plurality of modules. Each of the plurality of modules can include computer-readable instructions stored in the computer-readable medium that, when executed by the one or more processors, cause the one or more processors to perform operations. For example, the plurality of modules can include an automation application provisioning module (AAPM) to configure and provision relationships among input and output units of the AA devices and the non-AA devices. The plurality of modules also can include an automation application control module (AACM) to control network resources allocation responsive to the AAPM. Further, the plurality of modules can include a network infrastructure interface module (NIIM) to interface with each of the plurality of devices and measure performance of the plurality of devices. The plurality of modules still further can include a network performance analysis module (NPAM) to analyze performance of the plurality of devices and identify optimal network topologies associated with the plurality of devices responsive to the NIIM. Additionally, the plurality of modules can include a network resources allocation platform module (NPM) to control network resources allocation responsive to the AAPM, the AACM, and the NPAM thereby to enhance coexistence of the AA devices and the non-AA devices within the communication network.

In some circumstances, the AAPM, the AACM, the NPM, the NIIM, and the NPAM collectively can form an integrated Internet protocol (IIPo)-based wireless network platform thereby to define a multi-automation application on integrated IP over Ethernet network (AAIIPoEN) platform. Further, communication through the communication network can include communication among a plurality of layers. For example, the plurality of layers can include a network logic control layer, an application logic control layer, and an input/output layer for each of the plurality of devices. Further, the AAIIPoEN platform can include the application logic control layer and the network logic control layer. The AAIIPoEN platform also can be configured to link the application logic control layer and the network logic control layer thereby to provide dynamic priority allocation, scheduling, and behavior identification of request messages at the application logic control layer and further to map the request messages to the network logic control layer and to the respective input/output layer for each of the plurality of devices.

Additionally, the operations of the AAPM can include converting relationships among the input and output units of the plurality of devices into an electronic map of relationships among the input and output units of the plurality of devices. The operations of the AAPM also can include establishing a priority order for execution of a plurality of application tasks associated with the plurality of devices. Each of the plurality of application tasks can be associated with a request message. Furthermore, the operations of the AACM can include mapping the priority order to the application logic control layer responsive to receipt of the priority order from the AAPM. The mapped priority order thereby can define an application layer priority order. The operations of the AACM also can include updating, at each of a plurality of cycles, the application layer priority order responsive to one or more application task function runs and further responsive to determination of per message uniqueness as a function of time. In addition, the operations of the NIIM can include measuring performance data related to the plurality of devices. The operations of the NPAM can include estimating predicted performance data related to the plurality of devices responsive to receipt of the performance data from the NIIM. The operations of the NPAM also can include identifying the optimal network topologies associated with the plurality of devices responsive to analysis of the performance data and the predicted performance data. In addition, the operations of the NPM can include mapping the application layer priority order to the network logic control layer responsive to receipt of the application layer priority order from the AACM and receipt of attributes of the AA devices and the electronic map of relationships among the input and output units of the plurality of devices from the AAPM. The mapped application layer priority order thereby can define a network layer priority order. The operations of the NPM also can include updating the network layer priority order responsive to receipt of the optimal network topologies from the NPAM thereby to improve the functioning of the system.

In some instances, establishing the priority order can include assigning a priority rank to each request message responsive to determination of one or more attributes of the respective request message and receipt of the performance data from the NIIM. The one or more attributes of the respective request message can be configured to include command type. Further, command type can be configured to include one or more of the following: open loop, closed loop, cascaded loop, and protection and safety system loop. Establishing the priority order also can include assigning a higher priority rank to a first set of one or more request messages than to a second set of one or more request messages when each of the first set of request messages is associated with the AA devices and each of the second set of request messages is associated with the non-AA devices. In addition, establishing the priority order can include assigning a relatively high priority rank to a third set of one or more request messages when each of the third set of request messages has unique stringent time delay requirements. Establishing the priority order further can include assigning a fixed priority rank to a fourth set of one or more request messages when each of the fourth set of request messages is associated with a set of one or more of the AA devices.

In addition, each request message can be associated with an objective, and the operations of the AACM further can include sending the application layer priority order to the NPM responsive to update of the application layer priority order and updating the application layer priority order responsive to receipt of the network layer priority order from the NPM. The operations of the AACM then can include invoking one or more alternative request messages to achieve the respective objectives of one or more of the request messages responsive to receipt of information related to critical network areas that cannot be reached from the NPM and further responsive to receipt of the optimal network topologies from the NPAM. In addition, the operations of the AACM can include sending an override priority to the NPM responsive to receipt of the override priority from a second set of one or more of the plurality of devices. The operations of the AACM also can include determining whether each request message is validated and updating an application run schedule responsive to update of the application layer priority order.

Additionally, the operations of the NPM further can include sending the network layer priority order to the AACM responsive to update of the network layer priority order thereby to enable further update of the application layer priority order to improve the functioning of the system. The operations of the NPM also can include sending information related to critical network areas that cannot be reached to the AACM responsive to receipt of the attributes of the AA devices and the electronic map of relationships among the input and output units of the plurality of devices from the AAPM thereby to enable invocation of the one or more alternative messages. Further, the operations of the NPM can include restricting transition and dynamic changes of the set of one or more of the AA devices.

In some instances, the operations of the AACM further can include synchronizing one or more message timeslots associated with one or more of the request messages between two or more of the plurality of devices and updating the application layer priority order responsive to synchronization of the one or more message timeslots. Additionally, the AA devices can be configured to include one or more automation application controllers and one or more logic solvers. The operations of the AAPM further can include providing a front-end user logic execution interface and setting one or more thresholds and one or more ranges for operations of the one or more logic solvers. In addition, the operations of the AAPM can include configuring the AACM and sending attributes of the AA devices and the electronic map of relationships among the input and output units of the plurality of devices to the NPM. The operations of the NPAM further can include recording the performance data related to the plurality of devices responsive to receipt of the performance data from the NIIM and sending the optimal network topologies to the NPM thereby to provide recommendations to the NPM. The AA devices can include one or more of sensors, actuators, controllers, and logic solvers. Further, the AA devices can be related to one or more of hydrocarbon processes, power, utilities, factory operations, work cells, and intelligent controllers.

In addition, an embodiment can include a computer-implemented method to provide adaptive priority scheduling of communications over a communication network and dynamic resources allocation among a plurality of devices positioned in the communication network. A method according to an embodiment can include configuring and provisioning relationships among input and output units of a plurality of devices positioned in a communication network. Each of the plurality of devices can be configured to be in communication with another one or more of the plurality of devices through the communication network. In addition, each of the plurality of devices also can be configured to send and receive messages through a respective input and output unit. The plurality of devices can be configured to include a plurality of devices equipped with embedded intelligence thereby to define automation application (AA) devices. In addition, the plurality of devices also can be configured to include one or more other devices that are not equipped with embedded intelligence thereby to define non-AA devices. A method also can include controlling network resources allocation responsive to the configuration and provision of relationships among the input and output units of the plurality of devices and interfacing with each of the plurality of devices. A method further can include measuring performance of the plurality of devices responsive to interface with each of the plurality of devices and analyzing performance of the plurality of devices responsive to measurement of performance of the plurality of devices. Still further, a method can include identifying optimal network topologies associated with the plurality of devices responsive to the analysis of performance of the plurality of devices. In addition, a method can include controlling network resources allocation responsive to the configuration and provision of relationships among the input and output units of the plurality of devices, the control of network resources allocation, and the analysis of performance of the plurality of devices thereby to enhance coexistence of the AA devices and the non-AA devices within the communication network.

In some instances, communication through the communication network can include communication among a plurality of layers. The plurality of layers can include a network logic control layer, an application logic control layer, and an input/output layer for each of the plurality of devices. In addition, a method further can include linking the application logic control layer and the network logic control layer thereby to provide dynamic priority allocation, scheduling, and behavior identification of request messages at the application logic control layer and further to map the request messages to the network logic control layer and to the respective input/output layer for each of the plurality of devices. Further, a method also can include converting relationships among the input and output units of the plurality of devices into an electronic map of relationships among the input and output units of the plurality of devices. A method can include, in addition, establishing a priority order for execution of a plurality of application tasks associated with the plurality of devices. Each of the plurality of application tasks can be associated with a request message. A method still further can include mapping the priority order to the application logic control layer responsive to establishment of the priority order from the AAPM thereby to define an application layer priority order. A method also can include updating, at each of a plurality of cycles, the application layer priority order responsive to one or more application task function runs and further responsive to determination of per message uniqueness as a function of time. In addition, a method can include estimating predicted performance data related to the plurality of devices responsive to measurement of performance of the plurality of devices and identifying the optimal network topologies associated with the plurality of devices responsive to analysis of the measured performance of the plurality of devices and the predicted performance data. A method further can include mapping the application layer priority order to the network logic control layer responsive to analysis of the application layer priority order, attributes of the AA devices, and the electronic map of relationships among the input and output units of the plurality of devices thereby to define a network layer priority order. Still further, a method can include updating the network layer priority order responsive to analysis of the optimal network topologies thereby to improve the functioning of a computer associated with the plurality of devices.

In some circumstances, establishing the priority order can include assigning a priority rank to each request message responsive to determination of one or more attributes of the respective request message and measurement of performance of the plurality of devices. The one or more attributes of the respective request message can be configured to include command type. Further, command type can be configured to include one or more of the following: open loop, closed loop, cascaded loop, and protection and safety system loop. Establishing the priority order also can include assigning a higher priority rank to a first set of one or more request messages than to a second set of one or more request messages when each of the first set of request messages is associated with the AA devices and each of the second set of request messages is associated with the non-AA devices. In addition, establishing the priority order can include assigning a relatively high priority rank to a third set of one or more request messages when each of the third set of request messages has unique stringent time delay requirements. Establishing the priority order also can include assigning a fixed priority rank to a fourth set of one or more request messages when each of the fourth set of request messages is associated with a set of one or more of the AA devices.

Further, each request message can be associated with an objective. In addition, a method further can include updating the application layer priority order responsive to change in the network layer priority order and invoking one or more alternative request messages to achieve the respective objectives of one or more of the request messages responsive to analysis of information related to critical network areas that cannot be reached and the optimal network topologies. A method also can include updating the network layer priority order responsive to receipt of an override priority from a second set of one or more of the plurality of devices. A method further can include determining whether each request message is validated and updating an application run schedule responsive to update of the application layer priority order. A method still further can include restricting transition and dynamic changes of the set of one or more of the AA devices.

In some circumstances, a method further can include synchronizing one or more message timeslots associated with one or more of the request messages between two or more of the plurality of devices and updating the application layer priority order responsive to synchronization of the one or more message timeslots. In addition, the AA devices can be configured to include one or more automation application controllers and one or more logic solvers. A method also can include providing a front-end user logic execution interface and setting one or more thresholds and one or more ranges for operations of the one or more logic solvers. Additionally, a method can include recording the measured performance of the plurality of devices. The AA devices can include one or more of sensors, actuators, controllers, and logic solvers. Further, the AA devices can be related to one or more of hydrocarbon processes, power, utilities, factory operations, work cells, and intelligent controllers.

An embodiment of the invention also can include non-transitory computer-readable medium having one or more computer programs stored therein operable by one or more processors to provide adaptive priority scheduling of communications over a communication network and dynamic resources allocation among a plurality of devices positioned in the communication network. The one or more computer programs can include a set of instructions that, when executed by the one or more processors, cause the one or more processors to perform a series of operations. The operations can include configuring and provisioning relationships among input and output units of a plurality of devices positioned in a communication network. Each of the plurality of devices can be configured to be in communication with another one or more of the plurality of devices through the communication network. Further, each of the plurality of devices also can be configured to send and receive messages through a respective input and output unit. The plurality of devices can be configured to include a plurality of devices equipped with embedded intelligence thereby to define automation application (AA) devices. In addition, the plurality of devices also can be configured to include one or more other devices that are not equipped with embedded intelligence thereby to define non-AA devices. The operations also can include controlling network resources allocation responsive to the configuration and provision of relationships among the input and output units of the plurality of devices. The operations further can include interfacing with each of the plurality of devices and measuring performance of the plurality of devices responsive to interface with each of the plurality of devices. Still further, the operations can include analyzing performance of the plurality of devices responsive to measurement of performance of the plurality of devices. The operations also can include identifying optimal network topologies associated with the plurality of devices responsive to the analysis of performance of the plurality of devices. Additionally, the operations can include controlling network resources allocation responsive to the configuration and provision of relationships among the input and output units of the plurality of devices, the control of network resources allocation, and the analysis of performance of the plurality of devices thereby to enhance coexistence of the AA devices and the non-AA devices within the communication network.

In some circumstances, communication through the communication network can include communication among a plurality of layers. Additionally, the plurality of layers can include a network logic control layer, an application logic control layer, and an input/output layer for each of the plurality of devices. Further, the operations also can include linking the application logic control layer and the network logic control layer thereby to provide dynamic priority allocation, scheduling, and behavior identification of request messages at the application logic control layer and further to map the request messages to the network logic control layer and to the respective input/output layer for each of the plurality of devices. The operations still further can include converting relationships among the input and output units of the plurality of devices into an electronic map of relationships among the input and output units of the plurality of devices. In addition, the operations can include establishing a priority order for execution of a plurality of application tasks associated with the plurality of devices. Each of the plurality of application tasks can be associated with a request message. The operations also can include mapping the priority order to the application logic control layer responsive to establishment of the priority order thereby to define an application layer priority order. The operations also can include updating, at each of a plurality of cycles, the application layer priority order responsive to one or more application task function runs and further responsive to determination of per message uniqueness as a function of time. Still further, the operations can include estimating predicted performance data related to the plurality of devices responsive to measurement of performance of the plurality of devices. The operations also can include identifying the optimal network topologies associated with the plurality of devices responsive to analysis of the measured performance of the plurality of devices and the predicted performance data. The operations further can include mapping the application layer priority order to the network logic control layer responsive to analysis of the application layer priority order, attributes of the AA devices, and the electronic map of relationships among the input and output units of the plurality of devices thereby to define a network layer priority order. The operations still further can include updating the network layer priority order responsive to analysis of the optimal network topologies thereby to improve the functioning of a computer associated with the plurality of devices.

In addition, establishing the priority order can include assigning a priority rank to each request message responsive to determination of one or more attributes of the respective request message and measurement of performance of the plurality of devices. The one or more attributes of the respective request message can be configured to include command type, and command type can be configured to include one or more of the following: open loop, closed loop, cascaded loop, and protection and safety system loop. Establishing the priority order also can include assigning a higher priority rank to a first set of one or more request messages than to a second set of one or more request messages when each of the first set of request messages is associated with the AA devices and each of the second set of request messages is associated with the non-AA devices. Further, establishing the priority order can include assigning a relatively high priority rank to a third set of one or more request messages when each of the third set of request messages has unique stringent time delay requirements. In addition, establishing the priority order can include assigning a fixed priority rank to a fourth set of one or more request messages when each of the fourth set of request messages is associated with a set of one or more of the AA devices.

Further, each request message can be associated with an objective. The operations also can include updating the application layer priority order responsive to change in the network layer priority order and invoking one or more alternative request messages to achieve the respective objectives of one or more of the request messages responsive to analysis of information related to critical network areas that cannot be reached and the optimal network topologies. In addition, the operations can include updating the network layer priority order responsive to receipt of an override priority from a second set of one or more of the plurality of devices. The operations further can include determining whether each request message is validated and updating an application run schedule responsive to update of the application layer priority order. The operations still further can include restricting transition and dynamic changes of the set of one or more of the AA devices. In addition, the operations also can include synchronizing one or more message timeslots associated with one or more of the request messages between two or more of the plurality of devices and updating the application layer priority order responsive to synchronization of the one or more message timeslots. In some instances, the AA devices can be configured to include one or more automation application controllers and one or more logic solvers. Further, the operations also can include providing a front-end user logic execution interface and setting one or more thresholds and one or more ranges for operations of the one or more logic solvers. The operations additionally can include recording the measured performance of the plurality of devices. The AA devices can include one or more of sensors, actuators, controllers, and logic solvers, and the AA devices can be related to one or more of hydrocarbon processes, power, utilities, factory operations, work cells, and intelligent controllers.

BRIEF DESCRIPTION OF THE DRAWINGS

These and other features, aspects, and advantages of the present invention will become better understood with regard to the following descriptions, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION OF THE INVENTION

So that the manner in which the features and advantages of the embodiments of methods, systems, and non-transitory computer-readable medium having computer program stored therein of the present invention, as well as others, which will become apparent, may be understood in more detail, a more particular description of the embodiments of methods, systems, and non-transitory computer-readable medium having computer program stored therein of the present invention briefly summarized above may be had by reference to the embodiments thereof, which are illustrated in the appended drawings, which form a part of this specification. It is to be noted, however, that the drawings illustrate only various embodiments of the embodiments of methods, systems, and non-transitory computer-readable medium having computer program stored therein of the present invention and are therefore not to be considered limiting of the embodiments of methods, systems, and non-transitory computer-readable medium having computer program stored therein of the present invention's scope as it may include other effective embodiments as well.

Figure 1:
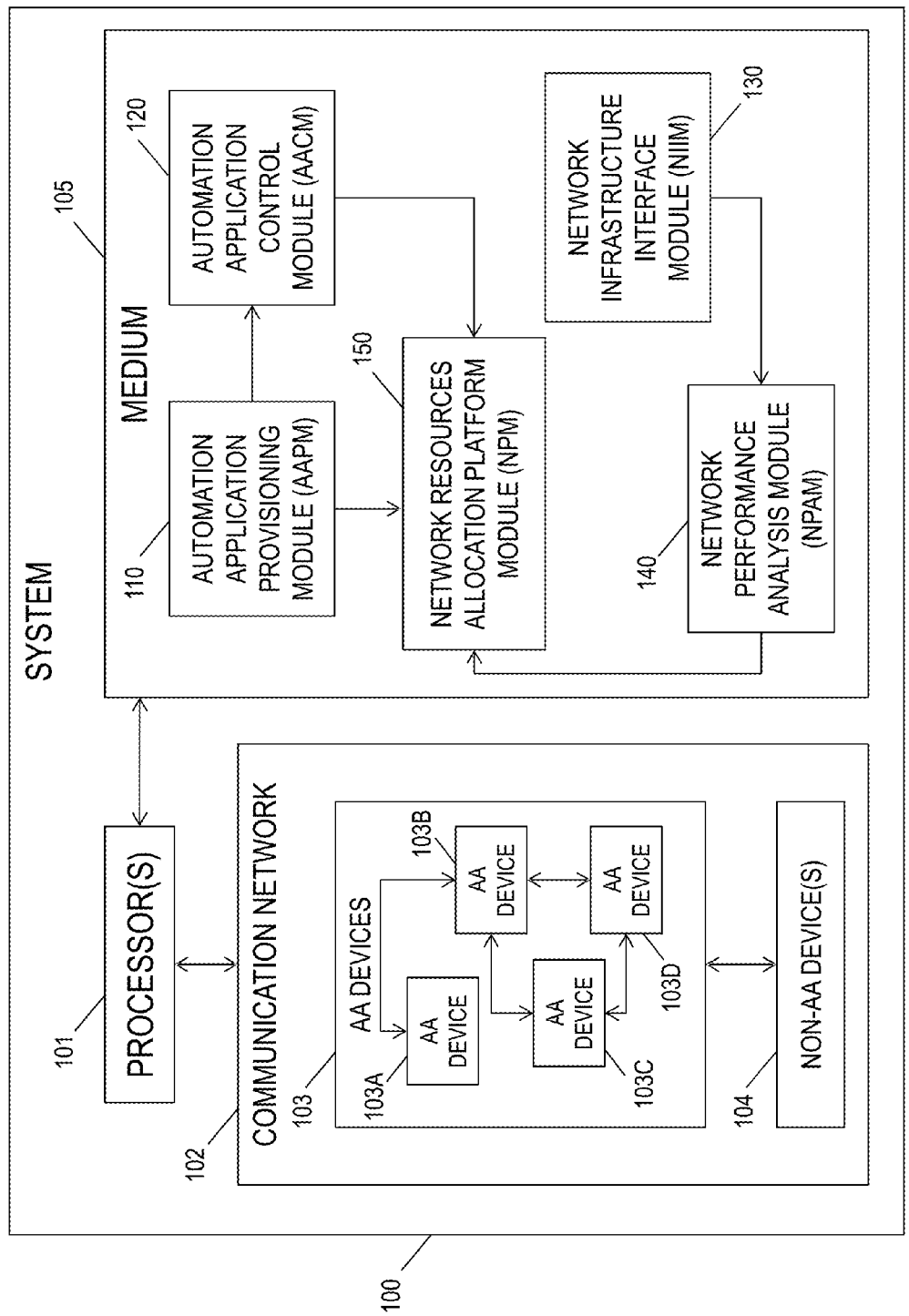
FIG. 1 is a schematic diagram of a system according to an embodiment of the invention.

Embodiments of the invention can include systems, computer-implemented methods, and non-transitory computer-readable medium having computer program stored therein to provide adaptive priority scheduling of communications over a communication network and dynamic resources allocation among a plurality of devices positioned in the communication network. For example, an embodiment of the invention can include a system 100 to provide adaptive priority scheduling of communications over a communication network 102 and dynamic resources allocation among a plurality of devices positioned in the communication network 102, as illustrated in FIG. 1, for example. A system 100 according to an embodiment can include, for example, one or more processors 101 and a communication network 102. A system 100 also can include a plurality of devices positioned in the communication network 102. Each of the plurality of devices can be configured to be in communication with the one or more processors 101 and another one or more of the plurality of devices through the communication network 102. Each of the plurality of devices also can be configured to send and receive messages through a respective input and output unit. Further, the plurality of devices can be configured to include a plurality of devices equipped with embedded intelligence, which thereby can define automation application (AA) devices 103. For example, the AA devices 103 can include devices 103A, 103B, 103C, and 103D, as illustrated in FIG. 1, for instance. As illustrated, for instance, device 103A can be in communication with device 103B, and device 103B in turn can be in communication with devices 103A, 103C, and 103D. Device 103C can be in communication with devices 103B and 103D. Further, device 103D can be in communication with devices 103B and 103C. The plurality of devices also can be configured to include one or more other devices that are not equipped with embedded intelligence, which thereby can define non-AA devices 104. A system 100 further can include non-transitory computer-readable medium 105 positioned in communication with the one or more processors 101 and configured to include a plurality of modules. Each of the plurality of modules can include computer-readable instructions stored in the computer-readable medium 105 that when executed by the one or more processors 101 cause the one or more processors 101 to perform operations.

For example, the plurality of modules can include an automation application provisioning module (AAPM) 110 to configure and provision relationships among input and output units of the AA devices 103 and the non-AA devices 104. The plurality of modules also can include an automation application control module (AACM) 120 to control network resources allocation responsive to the AAPM 110. In addition, the plurality of modules can include a network infrastructure interface module (NIIM) 130 to interface with each of the plurality of devices and measure performance of the plurality of devices, for example. The plurality of modules still further can include a network performance analysis module (NPAM) 140 to analyze performance of the plurality of devices and identify optimal network topologies associated with the plurality of devices responsive to the NIIM 130. The plurality of modules also can include a network resources allocation platform module (NPM) 150 to control network resources allocation responsive to the AAPM 110, the AACM 120, and the NPAM 140 thereby to enhance coexistence of the AA devices 103 and the non-AA devices 104 within the communication network 102.

In some circumstances, the AAPM 110, the AACM 120, the NPM 150, the NIIM 130, and the NPAM 140 collectively can form an integrated Internet protocol (IIPo)-based wireless network platform thereby to define a multi-automation application on integrated IP over Ethernet network (AAIIPoEN) platform. Further, communication through the communication network 102 can include communication among a plurality of layers, and the plurality of layers can include a network logic control layer, an application logic control layer, and an input/output layer for each of the plurality of devices. In addition, the AAIIPoEN platform can include the application logic control layer and the network logic control layer. The AAIIPoEN platform also can be configured to link the application logic control layer and the network logic control layer. Linking the application logic control layer and the network logic control layer thereby can provide dynamic priority allocation, scheduling, and behavior identification of request messages at the application logic control layer. Further, linking the application logic control layer and the network logic control layer can map the request messages to the network logic control layer and to the respective input/output layer for each of the plurality of devices.

Further, the operations of the AAPM 110 can include converting relationships among the input and output units of the plurality of devices into an electronic map of relationships among the input and output units of the plurality of devices. The operations of the AAPM 110 also can include establishing a priority order for execution of a plurality of application tasks associated with the plurality of devices. Each of the plurality of application tasks can be associated with a request message (e.g., a control command). In addition, the operations of the AACM 120 can include mapping the priority order to the application logic control layer responsive to receipt of the priority order from the AAPM 110 thereby to define an application layer priority order. The operations of the AACM 120 also can include updating, at each of a plurality of cycles, the application layer priority order responsive to one or more application task function runs and further responsive to determination of per message uniqueness as a function of time. The operations of the NIIM 130 can include measuring performance data related to the plurality of devices. Additionally, the operations of the NPAM 140 can include estimating predicted performance data related to the plurality of devices responsive to receipt of the performance data from the NIIM 130. The operations of the NPAM 140 also can include identifying the optimal network topologies associated with the plurality of devices responsive to analysis of the performance data and the predicted performance data. Still further, the operations of the NPM 150 can include mapping the application layer priority order to the network logic control layer responsive to receipt of the application layer priority order from the AACM 120 and receipt of attributes of the AA devices 103 and the electronic map of relationships among the input and output units of the plurality of devices from the AAPM 110. The map of the application layer priority order to the network logic control layer thereby can define a network layer priority order. In addition, the operations of the NPM 150 can include updating the network layer priority order responsive to receipt of the optimal network topologies from the NPAM 140 thereby to improve the functioning of the system 100.

In some instances, establishing the priority order can include, for example, assigning a priority rank to each request message responsive to determination of one or more attributes of the respective request message and receipt of the performance data from the NIIM 130. The one or more attributes of the respective request message can be configured to include command type, and command type can be configured to include one or more of the following: open loop, closed loop, cascaded loop, and protection and safety system loop. Establishing the priority order also can include assigning a higher priority rank to a first set of one or more request messages than to a second set of one or more request messages when each of the first set of request messages is associated with the AA devices 103 and each of the second set of request messages is associated with the non-AA devices 104. Establishing the priority order further can include assigning a relatively high priority rank to a third set of one or more request messages when each of the third set of request messages has unique stringent time delay requirements. For example, an AA can support different message types for each different function (such as control, monitoring, and system diagnostics, for example). The AACM 120 can have a function that is part of an AA where the AACM 120 can track the service and sub-service and their message threads. The tracking can be based on the message "time stamp" and "message type," for example. Further, there are different message types in AAs, including, for example: monitoring, control, and diagnostics. In addition, each message type can have different categories. For example, a monitoring message can have different categories, such as: monitoring messages to be acquired for general reporting (which can be considered a lowest priority message type); monitoring messages to be used in a calculation where the outcome will be fed back into the AA for subsequent operation action (which can be considered a high priority message type); and monitoring messages that can be required for direct feed into the AA for subsequent operational action (which can be considered a highest priority message type). Consequently, a request message that has unique stringent time delay requirements could be a highest priority message type, such as a monitoring message to be used in a calculation where the outcome will be fed back into the AA for subsequent operation action. Still further, establishing the priority order can include assigning a fixed priority rank to a fourth set of one or more request messages when each of the fourth set of request messages is associated with a set of one or more of the AA devices 130.

Additionally, each request message can be associated with an objective, and the operations of the AACM 120 further can include sending the application layer priority order to the NPM 150 responsive to update of the application layer priority order. The operations of the AACM 120 also can include updating the application layer priority order responsive to receipt of the network layer priority order from the NPM 150. Further, the operations of the AACM 120 can include invoking one or more alternative request messages to achieve the respective objectives of one or more of the request messages responsive to receipt of information related to critical network areas that cannot be reached from the NPM 150 and further responsive to receipt of the optimal network topologies from the NPAM 140. Still further, the operations of the AACM 120 can include sending an override priority to the NPM 150 responsive to receipt of the override priority from a second set of one or more of the plurality of devices and determining whether each request message is validated. The operations of the AACM 120 then can include updating an application run schedule responsive to update of the application layer priority order.

In some circumstances, the operations of the NPM 150 further can include sending the network layer priority order to the AACM 120 responsive to update of the network layer priority order. Sending the network layer priority order to the AACM 120 thereby can enable further update of the application layer priority order to improve the functioning of the system 100. The operations of the NPM 150 also can include sending information related to critical network areas that cannot be reached to the AACM 120 responsive to receipt of the attributes of the AA devices 103 and the electronic map of relationships among the input and output units of the plurality of devices from the AAPM 110 thereby to enable invocation of the one or more alternative messages. The operations of the NPM 150 still further can include restricting transition and dynamic changes of the set of one or more of the AA devices 103.

In some instances, for example, the operations of the AACM 120 also can include synchronizing one or more message timeslots associated with one or more of the request messages between two or more of the plurality of devices. A timeslot period can be in reference to an originating station, for example. Further, each message can be sent based on a time stamp. A time stamp can be considered the beginning of the timeslot for a message transmission, and the response can be considered the end of the timeslot. Synchronization can be supported based on message timeslot synchronization between two end stations and also synchronization with the network adapter priority tracking, for example. The timeslot for a message can be shifted (i.e., advanced or delayed) based on the priorities of the messages that are in the queue be transmitted, for instance. The operations of the AACM 120 further can include updating the application layer priority order responsive to synchronization of the one or more message timeslots. Additionally, the AA devices 103 can be configured to include one or more automation application controllers and one or more logic solvers. Further, the operations of the AAPM 110 also can include providing a front-end user logic execution interface and setting one or more thresholds and one or more ranges for operations of the one or more logic solvers. The operations of the AAPM 110 additionally can include configuring the AACM 120 and sending attributes of the AA devices 103 and the electronic map of relationships among the input and output units of the plurality of devices to the NPM 150. The operations of the NPAM 140 further can include recording the performance data related to the plurality of devices responsive to receipt of the performance data from the NIIM 130 and sending the optimal network topologies to the NPM 150 thereby to provide recommendations to the NPM 150. In some circumstances, the AA devices 103 can include one or more sensors, actuators, controllers, and logic solvers. Further, the AA devices 103 can be related to one or more of hydrocarbon processes, power, utilities, factory operations, work cells, and intelligent controllers, for example.

Figure 3:
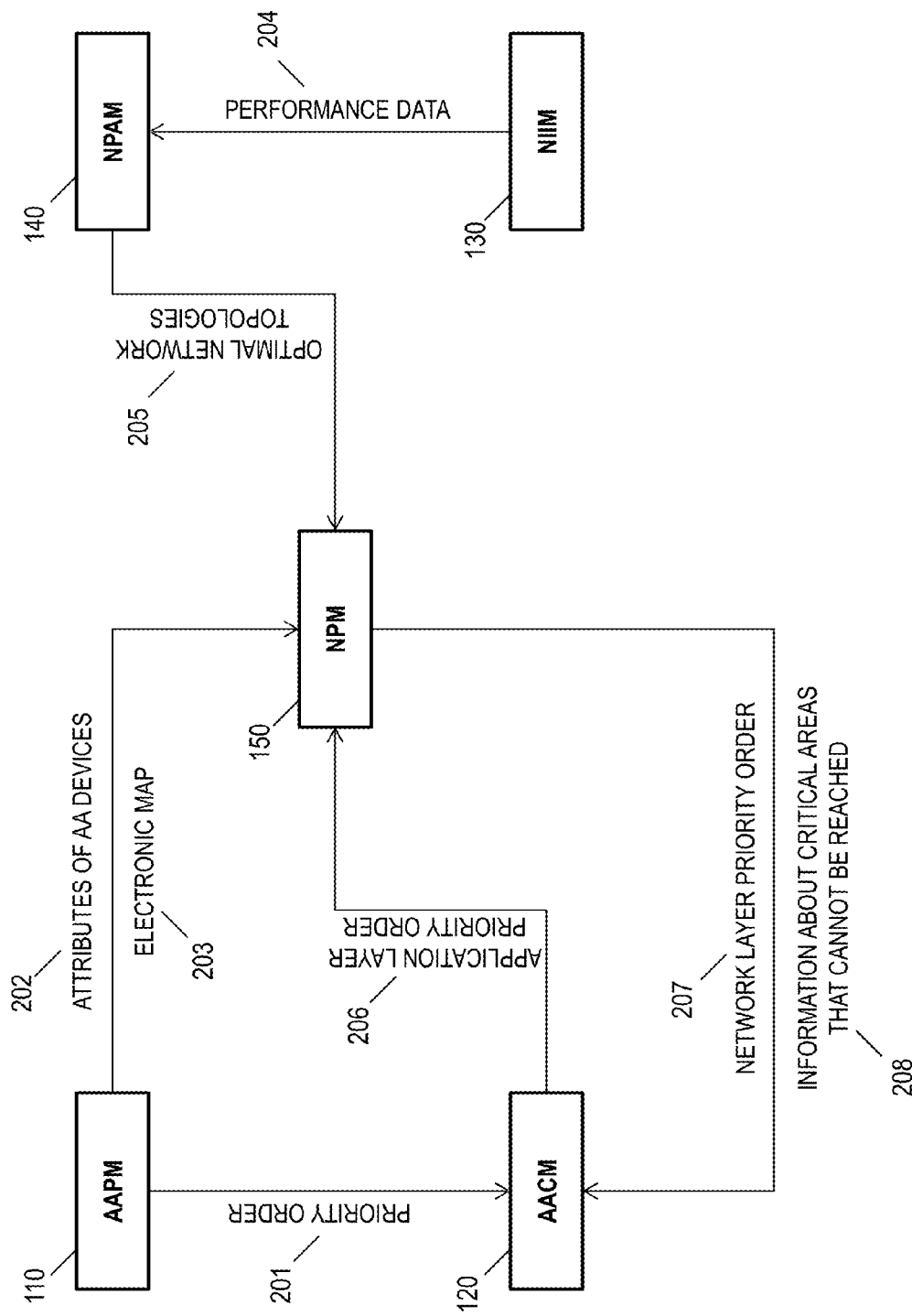
FIG. 3 is a schematic diagram of modules within a system according to an embodiment of the invention.

For example, the AAPM 110 can send the established priority order 201 to the AACM 120, as illustrated in FIG. 3, for instance. The AAPM 110 also can send attributes 202 of the AA devices 103 and the electronic map 203 of relationships among the input and output units of the plurality of devices to the NPM 150. Additionally, the NIIM 130 can send the measured performance data 204 related to the plurality of devices to the NPAM 140, which in turn can send the optimal network topologies 205 to the NPM 150. The AACM 120 can send the application layer priority order 206 to the NPM 150. The NPM 150 then can send the network layer priority order 207 and information related to critical network areas that cannot be reached 208 to the AACM 120.

Figure 4:
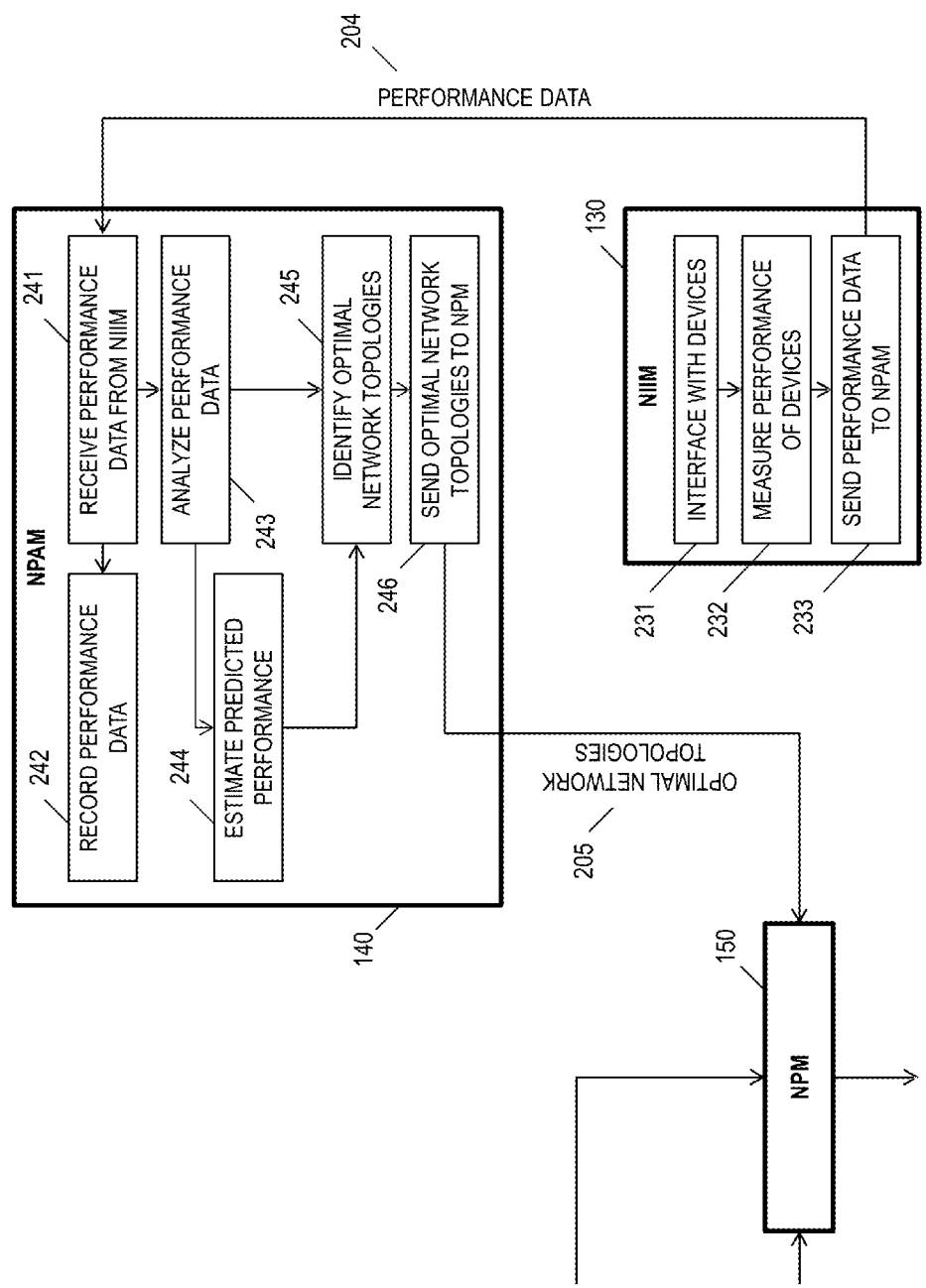
FIG. 4 is a schematic diagram of a system and method according to an embodiment of the invention.

More specifically, steps or operations associated with the NIIM 130 can include interfacing 231 with each of the plurality of devices and measuring 232 performance of the plurality of devices, as illustrated in FIG. 4, for example. Then, the NIIM 130 can send 233 the performance data 204 to the NPAM 140. After receiving 241 the performance data 204, the NPAM 140 can record 242 and analyze 243 the performance data 204. The NPAM 140 also can estimate 244 predicted performance data related to the plurality of devices and identify 245 the optimal network topologies 205 associated with the plurality of devices. The NPAM 140 then can send 246 the optimal network topologies 205 to the NPM 150. After receiving 257 the optimal network topologies 205, the NPM 150 can send 258 information related to critical network areas that cannot be reached 208 to the AACM 120, as illustrated in FIG. 5, for example.

Figure 6:
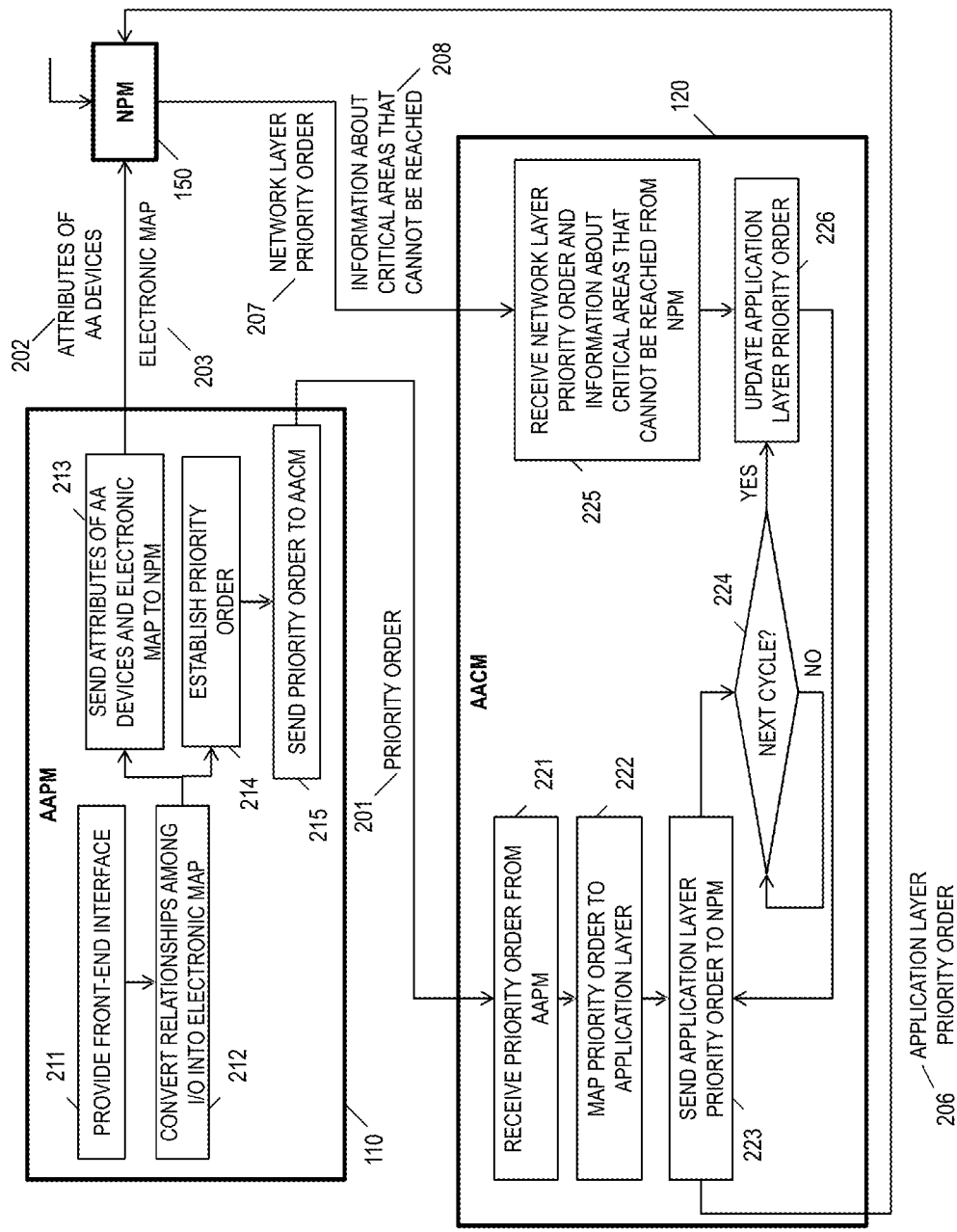
FIG. 6 is a schematic diagram of a system and method according to an embodiment of the invention.

Furthermore, the AAPM 110 can provide 211 a front-end user logic interface and convert 212 relationships among the input and output units of the plurality of devices into an electronic map 203 of the relationships, as illustrated in FIG. 6, for instance. The AAPM 110 then can send 213 attributes of the AA devices 202 and the electronic map 203 to the NPM 150. The AAPM 110 also can establish 214 a priority order 201 for execution of a plurality of application tasks and send 215 the priority order 201 to the AACM 120. After receiving 221 the priority order 201, the AACM 120 can map 222 the priority order 201 to the application logic control layer then can send 223 the application layer priority order 206 to the NPM 150. When the current cycle has concluded 224, the AACM 120 can update 226 the application layer priority order 206. That is, the AACM 120 can update 226 the application layer priority order 206 at each of a plurality of cycles. After the AACM 120 updates 226 the application layer priority order 206, the AACM 120 again can send 223 the application layer priority order 206 to the NPM 150.

Figure 5:
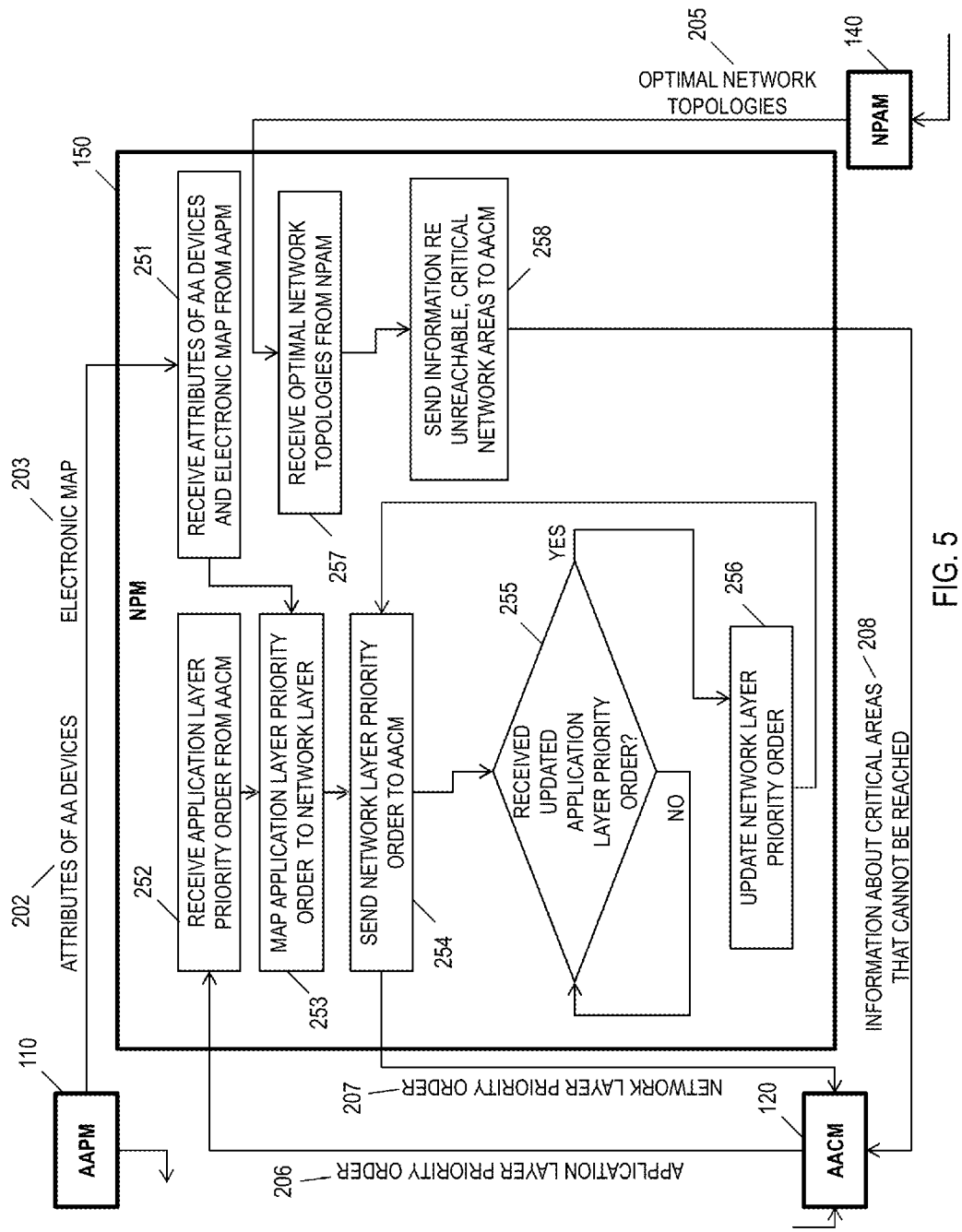
FIG. 5 is a schematic diagram of a system and method according to an embodiment of the invention.

After receiving 252 the application layer priority order 206 from the AACM 120 and receiving 251 the attributes 202 of the AA devices 103 and the electronic map 203 from the AAPM 110, the NPM 150 can map 253 the application layer priority order 206 to the network logic control layer, as illustrated in FIG. 5, for example. The NPM 150 then can send 254 the network layer priority order 207 to the AACM 120. If the NPM 150 receives 255 an updated application layer priority order 206 from the AACM 120, the NPM 150 can update 256 the network layer priority order 207 then again send 254 the network layer priority order 207 to the AACM 120. After the AACM 120 receives 225 the network layer priority order 207 and information related to critical network areas that cannot be reached 208, the AACM 120 can update 226 the application layer priority order 206 then again send the application layer priority order 223 to the NPM 150, as illustrated in FIG. 6, for example.

Consequently, embodiments of the invention can provide a combined automated application with a sensor network solution based on Ethernet technology that can be able to support multiple industrial AAs with multi-priority rankings over a local and or a wide area network infrastructure, for example. Further, embodiments can serve different networking operating environments, which can include intelligent field for oil and gas, substations/power smart grid, remote security, factory automation, and other sensor-based networks, for example. Embodiments of the invention also can provide a platform with capabilities to support an enterprise domain and the emergence of standard Ethernet interfaces of industrial AAs, such intelligent field, power, utilities and other instrumentation, on a combined industrial application and network, for example. Further, such a platform can be based on one integrated IP over Ethernet network (IIPoEN), for instance. The protocol can be integrated. For example, the network protocol can be based on standard TCP/UDP/IP communication protocol. The process AAs can be mapped to be either on TCP or UDP. The inherent protocol capabilities of TCP/IP, e.g., flow control, can be used to serve the multiple applications. Further, the TCP/UDP/IP can run on different communication mediums and can communicate with any automation device that has a direct Ethernet interface interface or a protocol converter gateway that can convert the device specific protocol (e.g., Modbus, Field Bus, DNP3) to an Ethernet protocol, for example.

Figure 2:
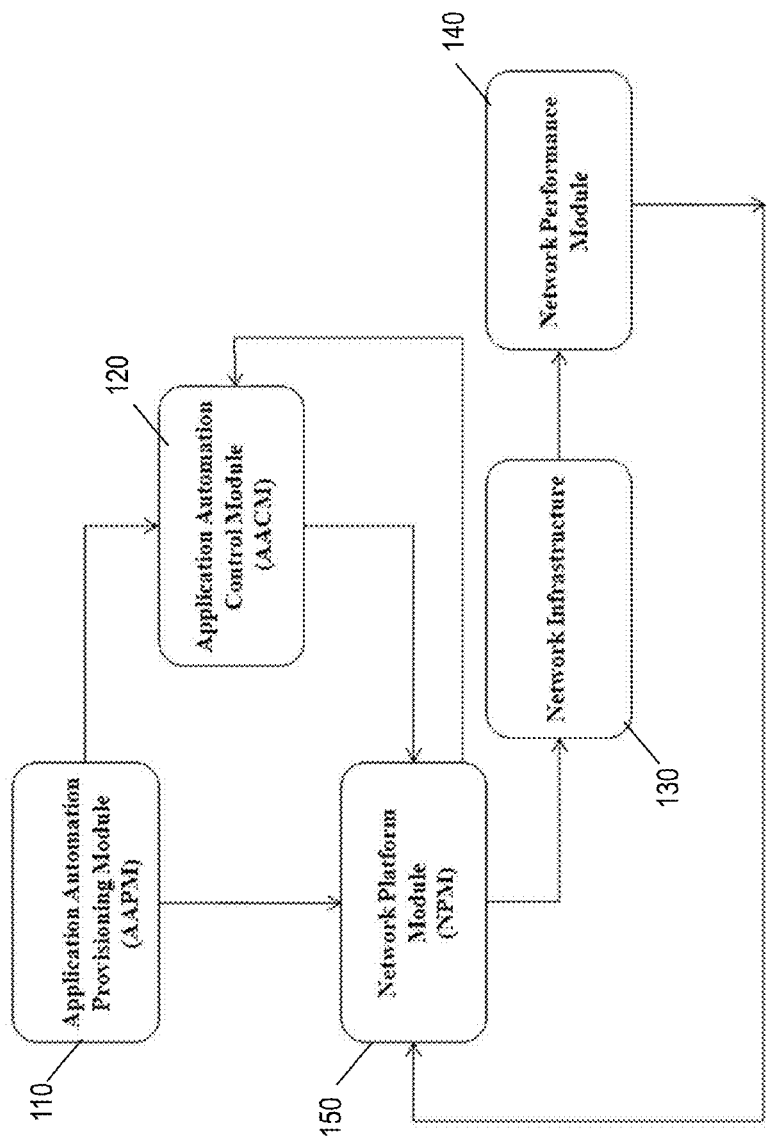
FIG. 2 is a schematic diagram of modules within a system according to an embodiment of the invention.

Advantageously, an IIPoEN can provide a platform for the coexistence of AAs and non-AA applications. Such a platform can exist inside a converged IP network and can be facilitated by dynamic AA priority classification coupled with network-based adaptive scheduling, i.e., implemented so as to continually track the AA priority and then award the highest priority to AAs according to their order of priority, followed by non-AA applications. A platform according to embodiments of the invention can include, for example, an automation application provisioning module (AAPM) 110, an automation application control module (AACM) 120, a network platform module (NPM) 150, a network infrastructure interface module (NIIM) 130, and a network performance analysis module (NPAM) 140, as illustrated in the depiction of a platform model, for example, in FIG. 2. Such modules, e.g., system modules, can be intertwined. An integrated IP over Ethernet network (IIPoEN) configuration can be based on utilizing priority-based scheduling defined by the NPM 150 that then can be used as the input to the AAPM 110, AACM 120, and NPAM 140.

For example, the AAPM 110 can provide a front-end user interface to execute the overall logic of the IIPoEN configuration. The AAPM 110 can enable configuring and provisioning the relationships between the inputs and outputs (I/O) of the controllers of the AAs, for example. In some instances, the AAPM 110 can enable an end user to configure and provision these relationships. This can include mapping the relationship among the I/O, setting thresholds and ranges for the different logic solvers operations, and mapping results into a priority level that can be executed and processed by the AACM 120. More specifically, configuring and provisioning the relationships also can include setting thresholds and ranges based on an actual process, defining inter-locking logic in a logic solver, and mapping logic solver results into a priority level that can be executed and processed by the AACM 120. Further, the AAPM 110 can provide an end user interface to configure input and output variables of the controllers, calculation functions, and logic loops. The AAPM 110 also can provide an end user interface to configure the controllers' open, closed loop, cascaded loops, and inter-locking functions, for instance. In addition, the AAPM 110 can provide an end user interface to assign priority for every function, assign a unique priority for every output, and reorder priorities.

The AAPM 110 can include interfaces with both the AACM 120 and NPM 150 to map an application profile and attributes to the NIIM 130 (e.g., IIPoEN network interfaces, network node, network trunks) for LANs and WANs. Mapping the application profile and attributes to the NIIM 130 can provide numerous advantages. For example, the AAs can have different functions running concurrently on different unique sessions, and each session can be assigned with a unique priority. The AACM 120 can support the AA priority allocation. Further, the AA session priority can be mapped into its corresponding network priorities, which can be supported by the NPM 150.

In addition to the AAPM 110, the modules can include the AACM 120. The AACM 120 can invoke priority-based scheduling, with the highest priority being awarded to the highest ranked control commands/queries (e.g., open loop, closed loop, cascaded loop, and protection and safety systems loops). For example, closed loop commands can be considered higher in priority than open loop commands. Further, control commands can be classified based on the risk area for automation systems, for example. That is, some areas can be higher risk than others, and those with a higher risk area thus can be at a higher priority. In addition, some of the commands can be for safety systems that are typically considered highest priority; these commands that are targeted for safety systems accordingly can be marked with the highest priority. The AACM 120 can be user-flexible and, based on the operational philosophy of the system, the messages can be classified during the system setup and baseline configuration. The AACM 120 can be adaptive to changes in priority during different application task function runs, for example. In addition, an awarded priority can be based on an AA priority marking for a peer-to-peer and or peer-to-multi peer inter-locking or exchange. Moreover, a platform according to embodiments of the invention can use dynamic priority allocation, scheduling, and behavior identification at an application layer that can be mapped down to a network layer and an input/output layer. The AACM 120 can process and define the attributes of the I/O, controller, and supported services, such as monitoring, diagnostic data, and applications, for example.

Figure 7:
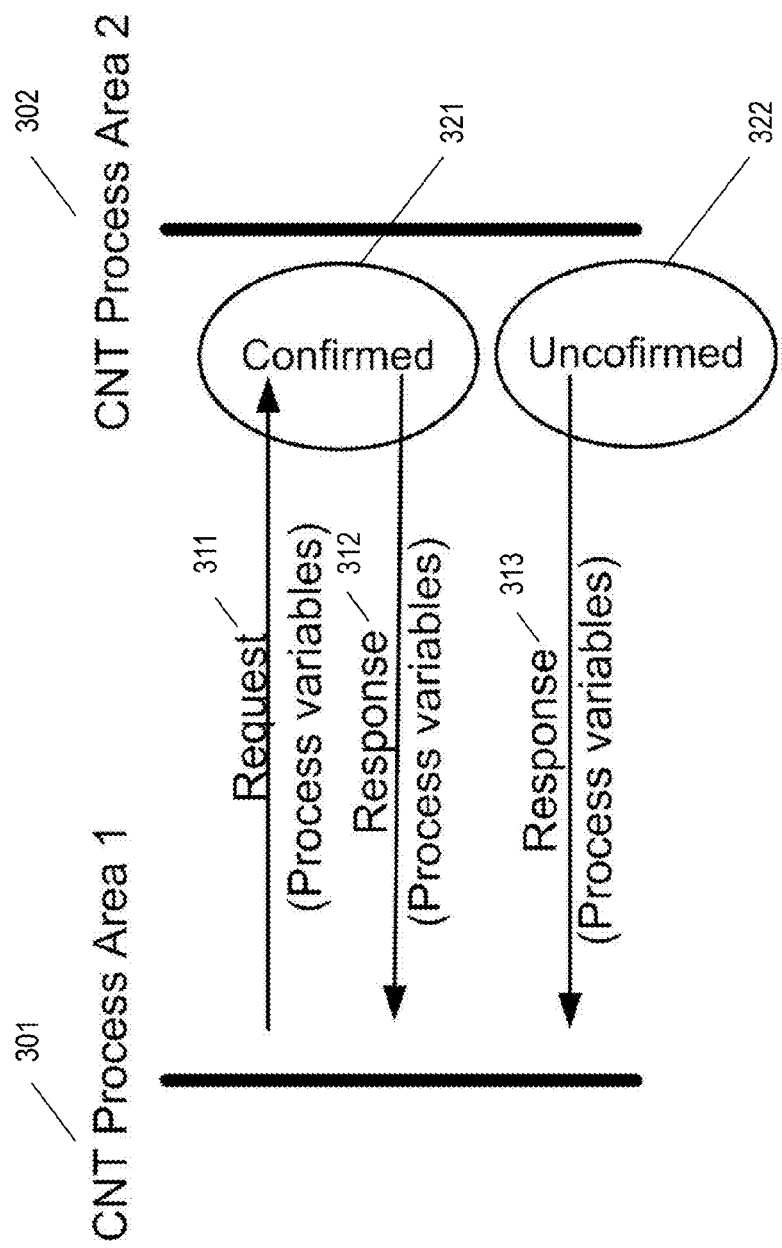
FIG. 7 is a schematic diagram of a method according to an embodiment of the invention.

Further, the AACM 120 can gauge behavior requirements for intra- and inter-area (e.g., facility) AA messaging exchange. AA messages can include, for example, confirmed (i.e., validated) and non-validated messages. An example of a method of validating messages is illustrated in FIG. 7, for example. As illustrated, for example, a request 311 (which can include process variables) can be sent from a controller or station (CNT) Process Area 1 301 to a CNT Process Area 2 302. A CNT can have two interfaces: one with the instrumentation sensors and actuators and another with the network to exchange data with other controllers, for example. The CNT Process Areas 1 and 2 can be operational areas that have sensors, valves, and actuators, for example, that can connect to the process infrastructure. If the request message 311 is confirmed 321, a response 312 (which also can include process variables) can be sent back to the CNT Process Area 1 301 to indicate that the message 311 has been validated by the CNT Process Area 2. If the message 311 is unconfirmed 322, however, a response 313 (which can include process variables) can be sent back to the CNT Process Area 1 301 to indicate that the message 311 is non-validated. Further, if a response 312 to the request message 311 was not sent within a defined time period (that is, a grace period), request message 311 can be flagged as unconfirmed by the CNT Process Area 1. A requested can be validated as confirmed in three ways: (1) when the receiving controller sends a response to the sender controller; (2) when the sender controller has a defined time grace period and has not received a response from the receiving controller within that time; and (3) as a result of an outcome of the request. For example, a request to increase a valve opening can result in increased flow. Flow thus can be monitored by the receiving controller and then sent in the response message to the sending controller. The sending controller then can compare the flow pre- and post-valve opening change, and a confirmation (i.e., message validation) can be flagged.

The AACM 120 can analyze application task function run behaviors and outcomes, and the outcome can lead to a change in the priority level for that task or a subsequent, linked task run. In addition, the AACM 120 can analyze the messaging exchange and validate associated event outcomes. The results of this analysis can be used at the network layer: the new AA awarded priority can be mapped to its corresponding network priority allocation. In addition, the results of this analysis also can be used at the I/O layer. For example, the new AA awarded priority can override the current function priority at the I/O layer, for instance.

Moreover, per message uniqueness as a function of time can be tracked, and the outcome can be used in recomputing the priority order. For example, different messages can be exchanged by AAs, including confirmed messages (e.g., messages requesting closing a valve) and non-confirmed messages (e.g., messages regarding flow rate). Each message can be tracked and classified by the AACM 120. Per message uniqueness then can be determined. Further, message timeslot tracking can track this per message uniqueness as a function of time. For example, each application run and function can have an assigned timeslot, and the AACM 120 can keep track of these different application runs. In an exemplary outcome, a close valve function run can be assigned a timeslot, and a flow rate can be assigned another timeslot. Additionally, the close valve function run can be assigned a higher priority than the flow rate function run, for instance. The close valve priority then can be mapped to its corresponding network priority, which can result in sending the close valve message earlier than the flow rate message.

Figure 8:
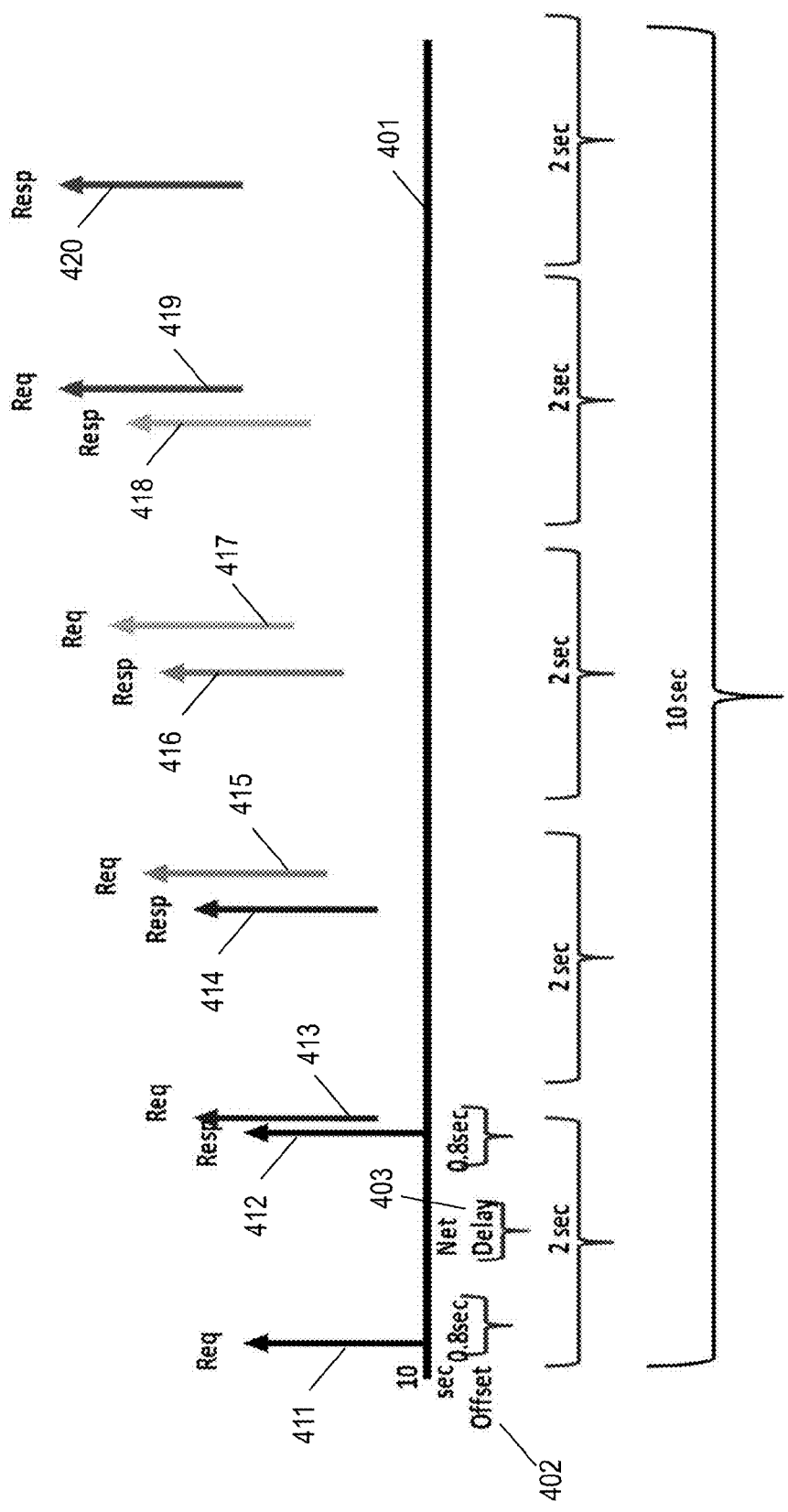
FIG. 8 is a schematic diagram of a method according to an embodiment of the invention.

An exemplary message timeslot tracking method is illustrated in FIG. 8, for example. Over time 401, offset 402 and net delay 403, for instance, can be associated with requests and their respective responses. Net delay can be the network delay, i.e., the total time for a request and response message less the controllers' processing time for the request and response. The time cycle can be the cycle for AACM 120 to reevaluate the priority level of each message type, for example. The time cycle can be programmable such that the time cycle can be in seconds and sub-seconds, for instance. Further, offset time can be the time between cycles, which can be negligible. As depicted in FIG. 8, for example, the vertical positions of the request/response pairs can signify the time stamp within the time cycle. For example, requests and their respective responses can include request 411 and response 412, request 413 and response 414, request 415 and response 416, request 417 and response 418, and request 419 and response 420. The respective time stamp can distinguish the different request types during each time cycle. The net delay can be tracked, and, when higher priority messages face longer net delays, such higher priority messages can be eligible to be shifted to higher priority. Otherwise, the system can treat all the messages with the cycle in a steady state mode (i.e., no changes in priority).

Figure 9:
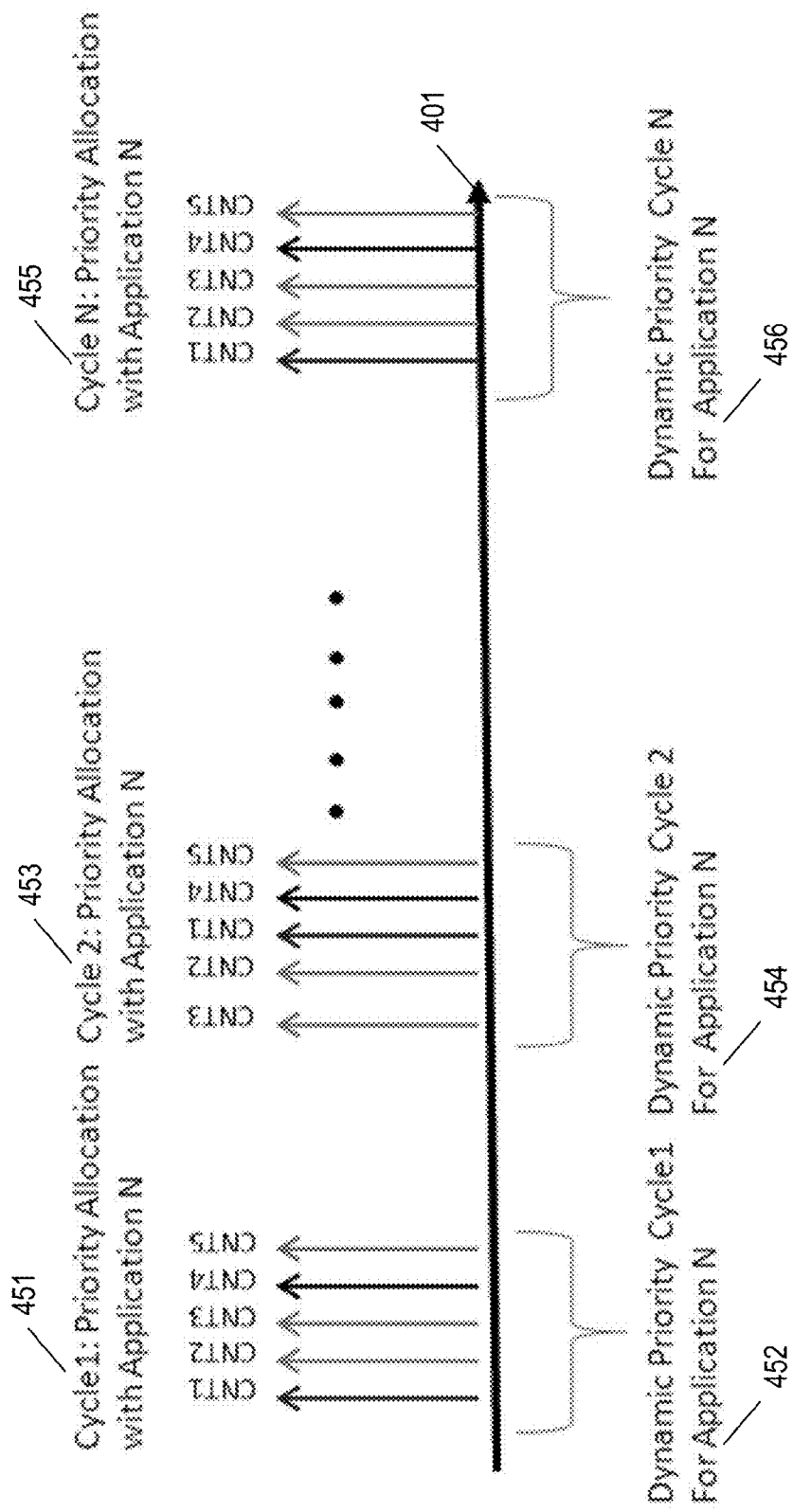
FIG. 9 is a schematic diagram of a method according to an embodiment of the invention.

Further, an exemplary application adaptive priority tracking method, including the continuous monitoring of the different messages from different controllers, can be illustrated in FIG. 9, for instance. For example, a controller message can be advanced due to a change in its priority in the subsequent cycle. As illustrated, for instance, a first cycle of priority allocation with Application N 451 can be associated with a first cycle of dynamic priority for Application N 452. Likewise, a second cycle of priority allocation 453 can be associated with a second cycle of dynamic priority 454. Additional cycles over time 401, through an Nth cycle of priority allocation 455 and its associated dynamic priority cycle 456. For example, the first cycle of priority allocation 451 can reflect the actual priority orders for all the different controller messages that can be utilized by the application. Further, the first cycle of dynamic priority 452 can reflect the first cycle for the AA application steady state operation. As depicted, five CNTs (controllers or stations that control a predefined process area) can be present, but the number of controllers can be unrestricted. The priority level, which can be reflected by the order of the controllers as depicted (e.g., CNT1, CNT2, CNT3, CNT4, CNT5 versus CNT3, CNT2, CNT1, CNT4, CNT5), can be defined by the AACM 120.

Figure 10:
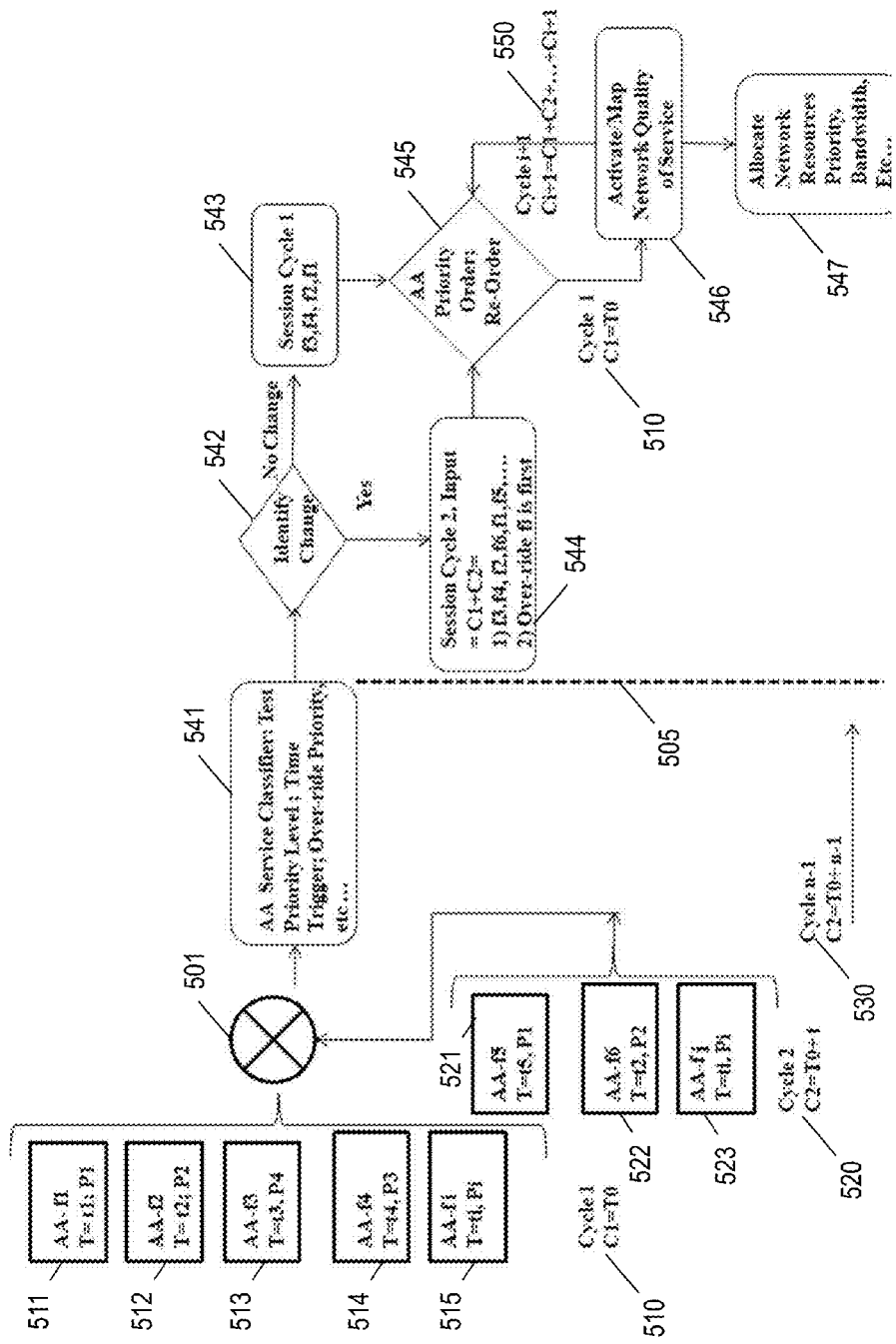
FIG. 10 is a schematic diagram of a method according to an embodiment of the invention.

In addition, an exemplary application-network adaptive priority tracking method is illustrated in FIG. 10, for example. As illustrated, for instance, initial input can be based on different functions with defined priorities. A first run can identify different application function runs based on an AACM 120 analysis, and a priority assignment can be allocated for each application run. During the next cycle, all applications runs can be analyzed again by the AACM 120, and their priorities can be remapped based on the analysis outcomes. The outcomes of the AAs' priority reordering then can be mapped to the corresponding network priorities. For example, a first cycle 510 can include several application function runs 511, 512, 513, 514, and 515. Application function run 511, which can be associated with a function f1, can have a timeslot t1 and an assigned priority P1. Similarly, application function run 512 can be associated with function f2 and can have a timeslot t2 and an assigned priority P2. Further, application function run 513 can be associated with function f3 and can have a timeslot t3 and an assigned priority P4, and application function run 514 can be associated with function f4 and can have a timeslot t4 and an assigned priority P3. Additional application function runs can exist during the first cycle 510 through application function run 515, which can be associated with function f' and can have a timeslot $t_i$ and an assigned priority $P_i$. The next cycle 520 similarly can include several application function runs, including 521, 522, and 523. For example, application function run 521 can be associated with function f5 and can have a timeslot t5 and an assigned priority P1, and application function run 522 can be associated with function f6 and can have a timeslot t2 and an assigned priority P2. Additional application function runs can exist during the second cycle 520 through application function run 523, which can be associated with function $f_i$ and can have a timeslot $t'$ and an assigned priority $P_i$. Other cycles, through a cycle (n−1) 530, can follow until a time 505. As illustrated, n can indicate a cycle counter, which initially can be set at 1 at time 0 and can increase by 1 as a function of the dynamic priority cycle. Time 505 can be demarcation in time for processing the first set of combining cycles. The cycles of combining frequency can be on the order of seconds and or sub-seconds, depending on the process. The cycles then can be added 501 to generate an AA service classifier 541, which can include a test priority level, a time trigger, and an override priority. That is, at step 501, a new cycle can be combined with a previous cycle in preparation for step 541. At step 541, a service classifier can be activated to address the priority order for all of the different activated functions. The time stamp for each activated function can be used to sequence the order of functions and reflect their new class of priority. The new cycle can bring new activated functions. A method then can include determining whether a change has occurred at step 542. If no change has occurred at step 542, a first session cycle 543 (which can include application functions f3, f4, f2, and f1) can follow. If a change has occurred at step 542, however, a second session cycle 544 can begin. The second session cycle 544 can include input from the first and second cycles, including (1) application functions f3, f4, f2, f6, f1, and f5 and (2) a first override priority related to function $f_i$. After either the first session cycle 543 or the second session cycle 544, a method can include establishing an AA priority order or reorder 545 (i.e., an AACM 120 decision) then activating/mapping a network QoS 546 for each cycle from the first cycle 510 to a cycle (i+1) 550. A method then can include allocating network resources 547, including priority and bandwidth.

Figure 11:
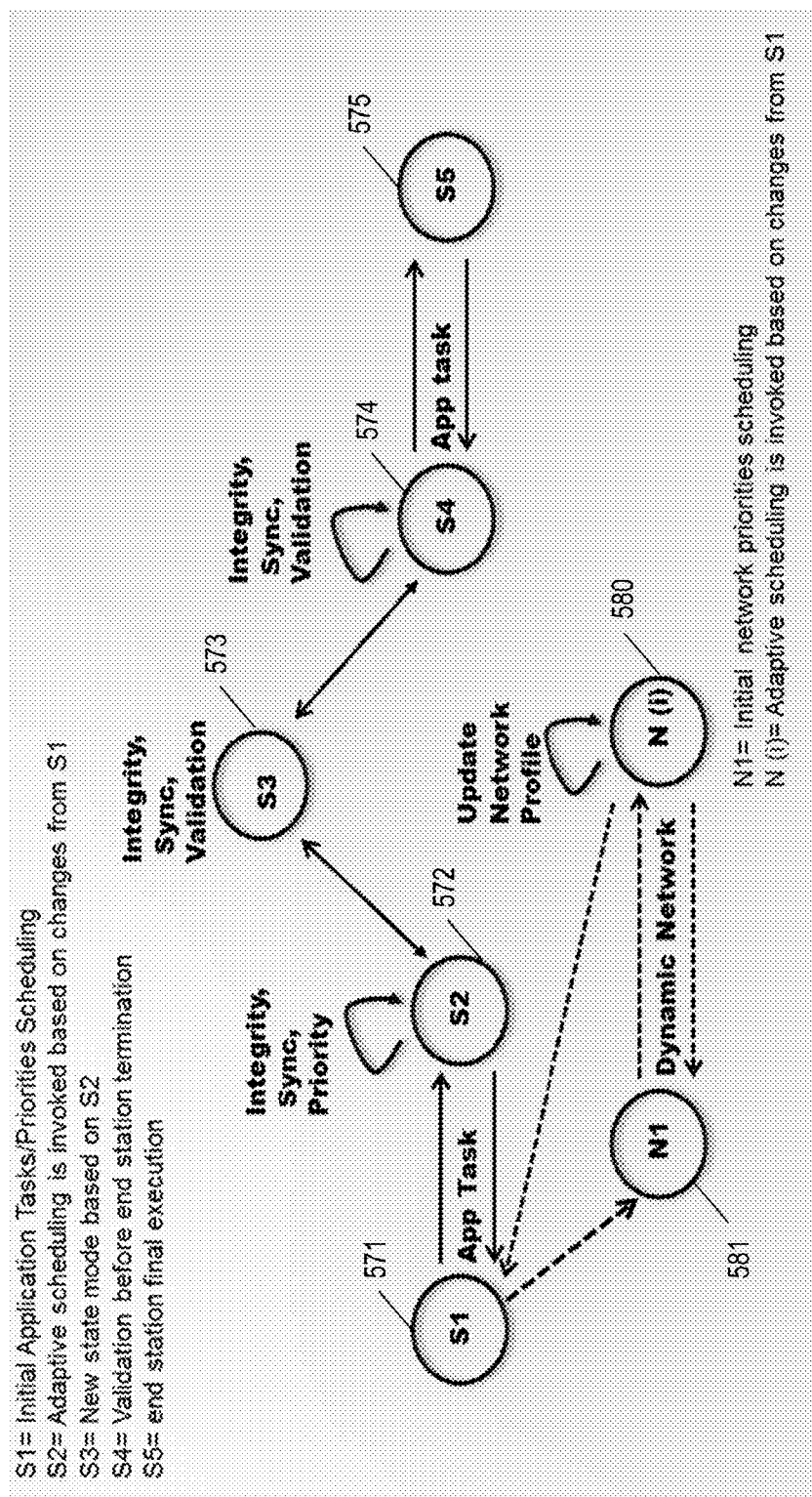
FIG. 11 is a schematic diagram of a method according to an embodiment of the invention.

Further, the AACM 120 can resemble a state machine flow between different tasks invoked in the AACM 120, for example. An exemplary state machine sample model is illustrated in FIG. 11, for instance. The depicted state machine can illustrate, for example, an AA application layer and network layer execution. As depicted, for example, an initial application tasks/priorities scheduling state S1 571 can be followed by an adaptive scheduling state S2 572, where the adaptive scheduling can be invoked based on changes from state S1 571. Further, state S2 572 can include integrity, sync, and priority features, which can be invoked at each state to ensure that the attributes are truly reflected in the new state. Then, a new state mode S3 573 can be based on state S2 572. State S3 573 can include integrity, sync, and validation features. Further, a validation state S4 574, before an end station termination, can precede an end station final execution state S5 575. State S4 574 can include integrity, sync, and validation features, as well. Additionally, an initial network priority state N1 581 can be followed by an adaptive scheduling state N(i) 580, where the adaptive scheduling can be invoked based on changes from state S1 571. State N(i) 580 also can update a network profile, for example. A dynamic network between state N(i) 580 and state N1 581 can reflect mapping of the application state to the network priority configurator to allocate network resources for the application.

The AACM 120 can compute the priority order on a cyclic basis. The length of a cycle can be programmed (e.g., sub seconds). The new priority assignment can be sent to the NPM 150 to change the QoS on the network infrastructure interfaces. Then, the dynamics in priority can be recomputed on a cyclic basis. The AACM 120 also can support intervention by an operator to override priority, in some instances. The new order of priority and the revised QoS mapping can be dependent on an AA priority order and network infrastructure performance, resulting in dynamic QoS network resources allocation. The QoS remapping can result from a dynamic QoS mapping. During each cycle, each application run can have a timeslot, which can be based on its current priority. If the application run priority changes in the next time cycle, the timeslot allocation can change accordingly, which can result in either advancing the application run or delaying the application run from an earlier allocated timeslot. Each cycle can be separate from its timeslots, but the AACM 120 can look at all of the different cycles and assign priorities accordingly. The number of cycles associated with activating a map of network QoS can be a function of the process and AA, for example. Further, the time associated with the step can be configurable (e.g., sub-second, seconds, minutes, hours). This can be dependent on the available computing power, available bandwidth, and the nature of the actual process, in some instances. Advantageously, embodiments of the invention can govern two resource allocations as a result of the change in priority order within cycles: AA and network resources. The AA function runs can be governed by their assigned priority. For example, closing a valve can be a higher priority than a flow rate function; consequently, a logic controller can execute the valve closing prior to processing the flow rate function. With respect to the network resources, the applications with a higher priority can be mapped to a higher network priority assignment, which can result in a faster transmission.

Further, the AACM 120 can be configured by the AAPM 110, and the AACM 120 logic flow can be based on priority level and time trigger. Input to the AACM 120 can include the AAPM 110 and the NPM 150. The dynamic priority assignment can be based on a holistic view of both the application function(s) and the network performance, for example.

The AACM 120 network-based model can manifest itself to be integrated with remote control system platform capabilities at an end user's desktop, independent of space and time, for example. Further, a business proposition for a wide area converged IP network can be a virtual plant operation where subject matter expertise can be consolidated into a designated area to provide tactical engineering decisions, as well strategic operational and optimization planning. Moreover, descriptive data for AAs, such as oil and gas upstream processes (e.g., reservoir, gas and oil separation, etc.) and downstream process (e.g., refineries), now can be depicted in a continuum framework (i.e., an end-to-end operation) providing rich data, predictive capabilities, and on-time decision support. Similarly, embodiments can be applied to automated power systems, utilities, and other industrial applications that can be based on local or distributed remote operation.

In addition to the AAPM 110 and the AACM 120, the modules can include the NPM 150. The NPM 150 can be an automated configuration interface. For example, the NPM 150 can translate a priority selection and designation for a service and sub-service to an actual configuration command attributes to be executed by the NIIM 130. Consequently, actions of the NPM 150 can include defining the QoS and priority level inside a network element (e.g., a network switch, router, or firewall). The QoS and priority level can be based on existing or future IEEE standards for QoS and priority attributes. That is, the NPM 150 can adopt and apply network scheduling theory by modifying the priority order defined by an Ethernet IP (e.g., IEEE 802.1p) priority-based scheduling QoS configuration model, resulting in seamless AA application performance. For example, AAs can be assigned a highest priority service type. Among different AAs, those AAs that have unique stringent time delay requirements can be assigned the highest priority. The dynamic priority from the AACM 120 can be invoked in IIPoEN via the NPM 150, for example. For AAs that have the highest fixed priority, the AACM 120 can have the option to restrict their transitions and possible dynamic changes. Additionally, override priority invoked by an operator or another device can be honored with highest priority in the AACM 120 and mapped into the NPM 150. Further, non-AA applications can be assigned predefined priorities based on their application performance conformance requirements. (Application performance conformance requirements can be the minimum network resource allocation required to successfully support the respective non-AA application.) Non-AA applications can be assigned the lowest priority because AAs can be more critical than non-AA applications. Further, embodiments of the invention can feature IIPoEN network healing capabilities to map into peer-to-peer data and peer to multi-peer data exchanges. That is, a network's ability to reconfigure itself can be used to overcome a link and or a node failure in support of AAs' operation sustainability. Further, the NPM 150 can be associated with cyber security capabilities. Such cyber security capabilities can include firewalls and strict data mapping based on isolation. These cyber security capabilities can provide the required protection for mixing multiple AAs on a common network infrastructure, for example. Still further, the NPM 150 can provide application solver, controller, and network element time synchronization.

The modules still further can include the NPAM 140. The NPAM 140 can collect real-time performance data for links, nodes, and AA controllers, and the NPAM 140 can have computation capabilities to predict performance of the network links and nodes. The NPAM 140 then can utilize the collected performance data for the network and can identify the overall optimum network topologies and recommendations that then can be fed into the NPM 150. That is, the NPAM 140 can send the profile of each network component to the NPM 150, for example. As a result, the NPM 150 can have the complete state of the network, which the NPM 150 then can send to the AACM 120. The new order of priority and the revised QoS mapping can be dependent on the AA priority order and the network infrastructure performance, for example, which can be identified and correlated by the AACM 120. The AACM 120 thus can use the optimal network topologies identified by the NPAM 140.

Additionally, the NPM 150 can send information about critical network areas that cannot be reached to the AACM 120. After receiving such information, the AACM 120 can wait for a predefined grace period, e.g., a period previously determined by an end user and entered by the user through an AA user interface. If this grace period has expired, the AACM 120 can proactively switch all reachable I/O units and controllers into a safe-mode operation. Switching into a safe-mode operation can include adjusting the different reachable I/O units and controllers into their safe operation (steady state operation thresholds). Any unreachable I/O units and controllers can have a similar grace period and can switch to safe operation thresholds concurrently according to the same time clock. After expiration of the grace period(s), the AACM 120 then can use the input to recompute the priority order or invoke alternate message(s) to achieve the respective intended original message objective. The AACM 120 also can configure all the I/O units and controllers with their attributes, thresholds, etc. When reachability is lost with the AACM 120, the AACM 120 can switch to a set of default settings after a grace period expiration.

Finally, the modules can include the NIIM 130. The NPM 150 can communicate attributes to the NIIM 130 for the different network components (egress and ingress ports) that the communication links can use to support the service delivery. That is, the NPM 150 can send a complete mapping for the QoS attributes and priority level to all the network components, for example. Further, the mapping can be sent to NIIM 130 for actual automated configuration. The NPM 150 also can send a no change trigger to the NIIM 130 if the QoS and priority have not changed. The network interface infrastructure (NII) associated with the NIIM 130 can include standard based Ethernet IP switches, routers, and interfaces, for example.

Embodiments thus can provide AA embedded intelligence with multi-thread processing, adaptive scheduling, and dynamic prioritization supporting multi-input for multiple systems, which can result in concurrent multi-output for multiple systems coupled with quality of service for IP over Ethernet to regulate traffic mix and support timely network delivery. Combinations of AAs and an IIPoEN can provide a network platform to support AAs in local area network (LAN) and wide area network (WAN) network models, for example. AAs can be composed of sensors, actuators, controllers, and logic solvers networked together to form independent control system platforms over an IIPoEN. The attributes of such a platform can be dynamic AA priority timeliness, reliable networking, data processing, higher frequency rate at finer granularity, data retention, uniform synchronizations, multi-tier operation, seamless interfaces, and integrated networks that can serve local AA segments, plant segments, and wide area network segments, for example. This manner of networking can form an independent control system platform because the dynamic AA priority classification can be coupled with network-based adaptive scheduling, i.e., implemented to continually track the AA priority. Further, the highest priority can be awarded to AAs according to their order of priority, followed by non-AA. Such an arrangement can provide application-level independence and thus can allow multiple applications to coexist on the same platform.

As a result, embodiments of the invention can provide numerous advantageous features. For example, embodiments can provide time synchronization for both (1) message timeslot synchronization between two end stations and (2) network adapter priority tracking. The time synchronization between applications can be supported by the AACM 120, for instance. Further, embodiments of the invention also can provide a fault tolerance data retransmission system and embedded intelligence, for example. In addition, embodiments can provide multi-thread processing and adaptive scheduling.

Further, embodiments of the invention can include methods, systems, and logic cross-over linking of an AA layer to a network control layer. The link can be bi-directional and thus can result in an adaptive and dynamic operation mode for the application and the network resources. Advantageously, embodiments can provide a direct linking between the AA and the network resource allocation for AAs, e.g., hydrocarbon, power, or oil and gas field AAs. Embodiments also can be applied to other industries such as factories, power substation, smart grid, utilities, and transportation. For example, embodiments can be used by: (1) providing a system and network model with loosely coupled architecture to meet operation node(s); (2) adopting adaptive priority scheduling and dynamic network resources allocations controlled by the application; (3) enabling network feedback to automation application and providing an open and closed loop between them.

Advantageously, embodiments can address problems related to multiple stand-alone applications and multiple network elements and computing systems. In addition, embodiments can increase floor space and power usage and reduce wiring duplication. Embodiments can address these problems, for example, by providing: (1) a multi-AA on an integrated IP over an Ethernet network (AA IIPoEN) platform; (2) a multi-AA with dynamic priority integrated IP over an Ethernet network (AA IIPoEN) platform; (3) dynamic AA priority mapping to integrated IP over an Ethernet network (AA IIPoEN) platform; (4) a multi non-AA co-existence on an integrated IP over an Ethernet network (AA IIPoEN) platform; and (5) an introduction of a high performance functionality, methodology, and mechanism to capture performance data (e.g., related to oil and gas wells or power end devices) and deliver it to a centralized data acquisition and control system.

Furthermore, embodiments of the invention also can include methods to provide adaptive priority scheduling of communications over a communication network 102 and dynamic resources allocation among a plurality of devices positioned in the communication network 102. For example, a computer-implemented method according to an embodiment can include a series of steps. The steps can include configuring and provisioning relationships among input and output units of a plurality of devices positioned in a communication network 102. For instance, each of the plurality of devices can be configured to be in communication with another one or more of the plurality of devices through the communication network 102. Further, each of the plurality of devices also can be configured to send and receive messages through a respective input and output unit. The plurality of devices can be configured to include a plurality of devices equipped with embedded intelligence thereby to define automation application (AA) devices 103, for example. Additionally, the plurality of devices also can be configured to include one or more other devices that are not equipped with embedded intelligence thereby to define non-AA devices 104. The steps further can include controlling network resources allocation responsive to the configuration and provision of relationships among the input and output units of the plurality of devices. The steps also can include interfacing with each of the plurality of devices and measuring performance of the plurality of devices responsive to interface with each of the plurality of devices. In addition, the steps can include analyzing performance of the plurality of devices responsive to measurement of performance of the plurality of devices. Still further, the steps can include identifying optimal network topologies associated with the plurality of devices responsive to the analysis of performance of the plurality of devices. The steps also can include controlling network resources allocation responsive to the configuration and provision of relationships among the input and output units of the plurality of devices, the control of network resources allocation, and the analysis of performance of the plurality of devices. Controlling network resources allocation thereby can enhance coexistence of the AA devices 103 and the non-AA devices 104 within the communication network 102.

In some instances, communication through the communication network 102 can include communication among a plurality of layers. Further, the plurality of layers can include a network logic control layer, an application logic control layer, and an input/output layer for each of the plurality of devices. Steps of a method further can include linking the application logic control layer and the network logic control layer thereby to provide dynamic priority allocation, scheduling, and behavior identification of request messages at the application logic control layer and further to map the request messages to the network logic control layer and to the respective input/output layer for each of the plurality of devices.

The steps also can include converting relationships among the input and output units of the plurality of devices into an electronic map of relationships among the input and output units of the plurality of devices. The steps further can include establishing a priority order for execution of a plurality of application tasks associated with the plurality of devices. Each of the plurality of application tasks can be associated with a request message. In addition, the steps can include mapping the priority order to the application logic control layer responsive to establishment of the priority order thereby to define an application layer priority order. The steps further can include updating—at each of a plurality of cycles—the application layer priority order responsive to one or more application task function runs and further responsive to determination of per message uniqueness as a function of time. The steps still further can include estimating predicted performance data related to the plurality of devices responsive to measurement of performance of the plurality of devices. Additionally, the steps can include identifying the optimal network topologies associated with the plurality of devices responsive to analysis of the measured performance of the plurality of devices and the predicted performance data. The steps can include mapping the application layer priority order to the network logic control layer responsive to analysis of the application layer priority order, attributes of the AA devices 103, and the electronic map of relationships among the input and output units of the plurality of devices thereby to define a network layer priority order. The steps also can include updating the network layer priority order responsive to analysis of the optimal network topologies thereby to improve the functioning of a computer associated with the plurality of devices. For example, a method according to an embodiment can include some of the steps illustrated in FIGS. 4-6, for instance.

In some circumstances, establishing the priority order can include assigning a priority rank to each request message responsive to determination of one or more attributes of the respective request message and measurement of performance of the plurality of devices. The one or more attributes of the respective request message can be configured to include command type, and command type can be configured to include one or more of the following: open loop, closed loop, cascaded loop, and protection and safety system loop. Establishing the priority order also can include assigning a higher priority rank to a first set of one or more request messages than to a second set of one or more request messages when each of the first set of request messages is associated with the AA devices 103 and each of the second set of request messages is associated with the non-AA devices 104. Establishing the priority order further can include assigning a relatively high priority rank to a third set of one or more request messages when each of the third set of request messages has unique stringent time delay requirements. Establishing the priority order still further can include assigning a fixed priority rank to a fourth set of one or more request messages when each of the fourth set of request messages is associated with a set of one or more of the AA devices 103.

Additionally, in some circumstances, each request message can be associated with an objective. The steps of a method also can include updating the application layer priority order responsive to change in the network layer priority order and invoking one or more alternative request messages to achieve the respective objectives of one or more of the request messages responsive to analysis of information related to critical network areas that cannot be reached and the optimal network topologies. The steps further can include updating the network layer priority order responsive to receipt of an override priority from a second set of one or more of the plurality of devices and determining whether each request message is validated. In addition, the steps can include updating an application run schedule responsive to update of the application layer priority order. The steps also can include, for example, restricting transition and dynamic changes of the set of one or more of the AA devices 103. In some instances, the steps can include synchronizing one or more message timeslots associated with one or more of the request messages between two or more of the plurality of devices and updating the application layer priority order responsive to synchronization of the one or more message timeslots.

In some circumstances, the AA devices 103 can be configured to include one or more automation application controllers and one or more logic solvers. Further, the steps can include providing a front-end user logic execution interface and setting one or more thresholds and one or more ranges for operations of the one or more logic solvers. The steps also can include recording the measured performance of the plurality of devices. Additionally, the AA devices 103 can include one or more of sensors, actuators, controllers, and logic solvers. The AA devices 103 can be related to one or more of hydrocarbon processes, power, utilities, factory operations, work cells, and intelligent controllers.

Embodiments of the invention further can include non-transitory computer-readable medium having one or more computer programs stored therein operable by one or more processors to provide adaptive priority scheduling of communications over a communication network 102 and dynamic resources allocation among a plurality of devices positioned in the communication network 102. For example, in non-transitory computer-readable medium according to an embodiment, the one or more computer programs can include a set of instructions that, when executed by the one or more processors, cause the one or more processors to perform a series of operations. For example, the operations can include configuring and provisioning relationships among input and output units of a plurality of devices positioned in a communication network 102. Each of the plurality of devices can be configured to be in communication with another one or more of the plurality of devices through the communication network 102, for example. Further, each of the plurality of devices also can be configured to send and receive messages through a respective input and output unit. The plurality of devices can be configured to include a plurality of devices equipped with embedded intelligence thereby to define automation application (AA) devices 103, for instance. Further, the plurality of devices also can be configured to include one or more other devices that are not equipped with embedded intelligence thereby to define non-AA devices 104. The operations can include controlling network resources allocation responsive to the configuration and provision of relationships among the input and output units of the plurality of devices. The operations also can include interfacing with each of the plurality of devices and measuring performance of the plurality of devices responsive to interface with each of the plurality of devices. In addition, the operations can include analyzing performance of the plurality of devices responsive to measurement of performance of the plurality of devices. The operations also can include identifying optimal network topologies associated with the plurality of devices responsive to the analysis of performance of the plurality of devices. The operations still further can include controlling network resources allocation responsive to the configuration and provision of relationships among the input and output units of the plurality of devices, the control of network resources allocation, and the analysis of performance of the plurality of devices thereby to enhance coexistence of the AA devices 103 and the non-AA devices 104 within the communication network 102.

In some circumstances, communication through the communication network 102 can include communication among a plurality of layers. Further, the plurality of layers can include a network logic control layer, an application logic control layer, and an input/output layer for each of the plurality of devices. In addition, the operations further can include linking the application logic control layer and the network logic control layer thereby to provide dynamic priority allocation, scheduling, and behavior identification of request messages at the application logic control layer and further to map the request messages to the network logic control layer and to the respective input/output layer for each of the plurality of devices. The operations still further can include converting relationships among the input and output units of the plurality of devices into an electronic map of relationships among the input and output units of the plurality of devices and establishing a priority order for execution of a plurality of application tasks associated with the plurality of devices. Each of the plurality of application tasks can be associated with a request message. In addition, the operations can include mapping the priority order to the application logic control layer responsive to establishment of the priority order thereby to define an application layer priority order. The operations also can include updating, at each of a plurality of cycles, the application layer priority order responsive to one or more application task function runs and further responsive to determination of per message uniqueness as a function of time. The operations can include estimating predicted performance data related to the plurality of devices responsive to measurement of performance of the plurality of devices and identifying the optimal network topologies associated with the plurality of devices responsive to analysis of the measured performance of the plurality of devices and the predicted performance data. The operations also can include mapping the application layer priority order to the network logic control layer responsive to analysis of the application layer priority order, attributes of the AA devices 103, and the electronic map of relationships among the input and output units of the plurality of devices thereby to define a network layer priority order. Still further, the operations can include updating the network layer priority order responsive to analysis of the optimal network topologies thereby to improve the functioning of a computer associated with the plurality of devices.

In some circumstances, establishing the priority order can include assigning a priority rank to each request message responsive to determination of one or more attributes of the respective request message and measurement of performance of the plurality of devices. The one or more attributes of the respective request message can be configured to include command type. Further, command type can be configured to include one or more of the following: open loop, closed loop, cascaded loop, and protection and safety system loop. In addition, establishing the priority order can include assigning a higher priority rank to a first set of one or more request messages than to a second set of one or more request messages when each of the first set of request messages is associated with the AA devices 103 and each of the second set of request messages is associated with the non-AA devices 104. Further, establishing the priority order can include assigning a relatively high priority rank to a third set of one or more request messages when each of the third set of request messages has unique stringent time delay requirements. Establishing the priority order still further can include assigning a fixed priority rank to a fourth set of one or more request messages when each of the fourth set of request messages is associated with a set of one or more of the AA devices 103.

In some instances, each request message can be associated with an objective. The operations further can include updating the application layer priority order responsive to change in the network layer priority order and invoking one or more alternative request messages to achieve the respective objectives of one or more of the request messages responsive to analysis of information related to critical network areas that cannot be reached and the optimal network topologies. The operations also can include updating the network layer priority order responsive to receipt of an override priority from a second set of one or more of the plurality of devices and determining whether each request message is validated.

Additionally, the operations can include updating an application run schedule responsive to update of the application layer priority order.

The operations further can include restricting transition and dynamic changes of the set of one or more of the AA devices 103 and synchronizing one or more message timeslots associated with one or more of the request messages between two or more of the plurality of devices. Additionally, the operations can include updating the application layer priority order responsive to synchronization of the one or more message timeslots. In some instances, the AA devices 103 can be configured to include one or more automation application controllers and one or more logic solvers. Further, the operations can include providing a front-end user logic execution interface and setting one or more thresholds and one or more ranges for operations of the one or more logic solvers. The operations also can include recording the measured performance of the plurality of devices. In some circumstances, the AA devices 103 can include one or more of sensors, actuators, controllers, and logic solvers. In addition, the AA devices 103 can be related to one or more of hydrocarbon processes, power, utilities, factory operations, work cells, and intelligent controllers.

In the various embodiments of the invention described herein, a person having ordinary skill in the art will recognize that various types of memory are readable by a computer, such as the memory described herein in reference to the various computers and servers, e.g., computer, computer server, web server, or other computers with embodiments of the present invention. Examples of computer-readable media can include but are not limited to: nonvolatile, hard-coded type media, such as read only memories (ROMs), CD-ROMs, and DVD-ROMs, or erasable, electrically programmable read only memories (EEPROMs); recordable type media, such as floppy disks, hard disk drives, CD-R/RWs, DVD-RAMs, DVD-R/RWs, DVD+R/RWs, flash drives, memory sticks, and other newer types of memories; and transmission type media such as digital and analog communication links. For example, such media can include operating instructions, as well as instructions related to the systems and the method steps described above and can operate on a computer. It will be understood by those skilled in the art that such media can be at other locations instead of, or in addition to, the locations described to store computer program products, e.g., including software thereon. It will be understood by those skilled in the art that the various software modules or electronic components described above can be implemented and maintained by electronic hardware, software, or a combination of the two, and that such embodiments are contemplated by embodiments of the present invention.

In the drawings and specification, there have been disclosed embodiments of methods, systems, and non-transitory computer-readable medium having computer program stored therein of the present invention, and although specific terms are employed, the terms are used in a descriptive sense only and not for purposes of limitation. The embodiments of methods, systems, and non-transitory computer-readable medium having computer program stored therein of the present invention have been described in considerable detail with specific reference to these illustrated embodiments. It will be apparent, however, that various modifications and changes can be made within the spirit and scope of the embodiments of methods, systems, and non-transitory computer-readable medium having computer program stored therein of the present invention as described in the foregoing specification, and such modifications and changes are to be considered equivalents and part of this disclosure.

That claimed is:

1. A system to provide adaptive priority scheduling of communications over a communication network and dynamic resources allocation among a plurality of devices positioned in the communication network, the system comprising:

one or more processors;

a communication network;

a plurality of devices positioned in the communication network, each of the plurality of devices being configured to be in communication with the one or more processors and another one or more of the plurality of devices through the communication network, each of the plurality of devices also configured to send and receive messages through a respective input and output unit, the plurality of devices configured to include a first subset of plurality of devices equipped with embedded intelligence thereby to define automation application (AA) devices, the plurality of devices also configured to include a second subset of plurality of devices that are not equipped with embedded intelligence thereby to define non-AA devices; and non-transitory computer-readable medium positioned in communication with the one or more processors and configured to include a plurality of modules, each of the plurality of modules including computer-readable instructions stored in the computer-readable medium that when executed by the one or more processors cause the one or more processors to perform operations, the plurality of modules including:

an automation application provisioning module (AAPM) to configure and provision relationships among input and output units of the AA devices and the non-AA devices, an automation application control module (AACM) to control network resources allocation responsive to the AAPM, a network infrastructure interface module (NIIM) to interface with each of the plurality of devices and measure performance of the plurality of devices, a network performance analysis module (NPAM) to analyze performance of the plurality of devices and identify optimal network topologies associated with the plurality of devices responsive to the NIIM, and a network resources allocation platform module (NPM) to control network resources allocation responsive to the AAPM, the AACM, and the NPAM thereby to enhance coexistence of the AA devices and the non-AA devices within the communication network, wherein the AAPM, the AACM, the NPM, the NIIM, and the NPAM collectively form an integrated Internet protocol (IIPo)-based wireless network platform thereby to define a multi-automation application on integrated IP over Ethernet network (AAIIPoEN) platform, wherein communication through the communication network includes communication among a plurality of layers, wherein the plurality of layers include a network logic control layer, an application logic control layer, and an input/output layer for each of the plurality of devices, and wherein the AAIIPoEN platform includes the application logic control layer and the network logic control layer and is configured to link the application logic control layer and the network logic control layer thereby to provide dynamic priority allocation, scheduling, and behavior identification of request messages at the application logic control layer and further to map the request messages to the network logic control layer and to the respective input/output layer for each of the plurality of devices.

2. The system as defined in claim 1, wherein the operations of the AAPM include converting relationships among the input and output units of the plurality of devices into an electronic map of relationships among the input and output units of the plurality of devices and establishing a priority order for execution of a plurality of application tasks associated with the plurality of devices, each of the plurality of application tasks associated with a request message; wherein the operations of the AACM include mapping the priority order to the application logic control layer responsive to receipt of the priority order from the AAPM thereby to define an application layer priority order and updating, at each of a plurality of cycles, the application layer priority order responsive to one or more application task function runs and further responsive to determination of per message uniqueness as a function of time; wherein the operations of the NIIM include measuring performance data related to the plurality of devices; wherein the operations of the NPAM include estimating predicted performance data related to the plurality of devices responsive to receipt of the performance data from the NIIM and identifying the optimal network topologies associated with the plurality of devices responsive to analysis of the performance data and the predicted performance data; and wherein the operations of the NPM include mapping the application layer priority order to the network logic control layer responsive to receipt of the application layer priority order from the AACM and receipt of attributes of the AA devices and the electronic map of relationships among the input and output units of the plurality of devices from the AAPM thereby to define a network layer priority order and updating the network layer priority order responsive to receipt of the optimal network topologies from the NPAM thereby to improve the functioning of the system.

3. The system as defined in claim 2, wherein establishing the priority order includes:
    assigning a priority rank to each request message responsive to determination of one or more attributes of the respective request message and receipt of the performance data from the NIIM, the one or more attributes of the respective request message configured to include command type, command type configured to include one or more of the following: open loop, closed loop, cascaded loop, and protection and safety system loop;
    assigning a higher priority rank to a first set of one or more request messages than to a second set of one or more request messages when each of the first set of request messages is associated with the AA devices and each of the second set of request messages is associated with the non-AA devices;
    assigning a relatively high priority rank to a third set of one or more request messages when each of the third set of request messages has unique stringent time delay requirements; and
    assigning a fixed priority rank to a fourth set of one or more request messages when each of the fourth set of request messages is associated with a set of one or more of the AA devices.

4. The system as defined in claim 3, wherein each request message is associated with an objective, and wherein the operations of the AACM further include:
    sending the application layer priority order to the NPM responsive to update of the application layer priority order;
    updating the application layer priority order responsive to receipt of the network layer priority order from the NPM;
    invoking one or more alternative request messages to achieve the respective objectives of one or more of the request messages responsive to receipt of information related to critical network areas that cannot be reached from the NPM and further responsive to receipt of the optimal network topologies from the NPAM;
    sending an override priority to the NPM responsive to receipt of the override priority from a second set of one or more of the plurality of devices;
    determining whether each request message is validated; and
    updating an application run schedule responsive to update of the application layer priority order.

5. The system as defined in claim 4, wherein the operations of the NPM further include:
    sending the network layer priority order to the AACM responsive to update of the network layer priority order thereby to enable further update of the application layer priority order to improve the functioning of the system;
    sending information related to critical network areas that cannot be reached to the AACM responsive to receipt of the attributes of the AA devices and the electronic map of relationships among the input and output units of the plurality of devices from the AAPM thereby to enable invocation of the one or more alternative messages; and
    restricting transition and dynamic changes of the set of one or more of the AA devices.

6. The system as defined in claim 2, wherein the operations of the AACM further include:
    synchronizing one or more message timeslots associated with one or more of the request messages between two or more of the plurality of devices; and
    updating the application layer priority order responsive to synchronization of the one or more message timeslots.

7. The system as defined in claim 2, wherein the AA devices are configured to include one or more automation application controllers and one or more logic solvers, and wherein the operations of the AAPM further include:
    providing a front-end user logic execution interface;
    setting one or more thresholds and one or more ranges for operations of the one or more logic solvers;
    configuring the AACM; and
    sending attributes of the AA devices and the electronic map of relationships among the input and output units of the plurality of devices to the NPM.

8. The system as defined in claim 2, wherein the operations of the NPAM further include:
    recording the performance data related to the plurality of devices responsive to receipt of the performance data from the NIIM; and
    sending the optimal network topologies to the NPM thereby to provide recommendations to the NPM.

9. The system as defined in claim 1, wherein the AA devices include one or more of sensors, actuators, controllers, and logic solvers, and wherein the AA devices are related to one or more of hydrocarbon processes, power, utilities, factory operations, work cells, and intelligent controllers.

10. A computer-implemented method to provide adaptive priority scheduling of communications over a communication network and dynamic resources allocation among a plurality of devices positioned in the communication network, the method comprising:

configuring and provisioning relationships among input and output units of a plurality of devices positioned in a communication network, each of the plurality of devices configured to be in communication with another one or more of the plurality of devices through the communication network, each of the plurality of devices also configured to send and receive messages through a respective input and output unit, the plurality of devices configured to include a first subset of plurality of devices equipped with embedded intelligence thereby to define automation application (AA) devices, the plurality of devices also configured to include a second subset of plurality of devices that are not equipped with embedded intelligence thereby to define non-AA devices;

controlling network resources allocation responsive to the configuration and provision of relationships among the input and output units of the plurality of devices;

interfacing with each of the plurality of devices;

measuring performance of the plurality of devices responsive to interface with each of the plurality of devices;

analyzing performance of the plurality of devices responsive to measurement of performance of the plurality of devices;

identifying optimal network topologies associated with the plurality of devices responsive to the analysis of performance of the plurality of devices; and controlling network resources allocation responsive to the configuration and provision of relationships among the input and output units of the plurality of devices, the control of network resources allocation, and the analysis of performance of the plurality of devices thereby to enhance coexistence of the AA devices and the non-AA devices within the communication network, wherein communication through the communication network includes communication among a plurality of layers, wherein the plurality of layers include a network logic control layer, an application logic control layer, and an input/output layer for each of the plurality of devices, and wherein the method further includes linking the application logic control layer and the network logic control layer thereby to provide dynamic priority allocation, scheduling, and behavior identification of request messages at the application logic control layer and further to map the request messages to the network logic control layer and to the respective input/output layer for each of the plurality of devices.

11. The computer-implemented method as defined in claim 10, wherein the method further includes:

converting relationships among the input and output units of the plurality of devices into an electronic map of relationships among the input and output units of the plurality of devices;

establishing a priority order for execution of a plurality of application tasks associated with the plurality of devices, each of the plurality of application tasks associated with a request message;

mapping the priority order to the application logic control layer responsive to establishment of the priority order thereby to define an application layer priority order;

updating, at each of a plurality of cycles, the application layer priority order responsive to one or more application task function runs and further responsive to determination of per message uniqueness as a function of time;

estimating predicted performance data related to the plurality of devices responsive to measurement of performance of the plurality of devices;

identifying the optimal network topologies associated with the plurality of devices responsive to analysis of the measured performance of the plurality of devices and the predicted performance data;

mapping the application layer priority order to the network logic control layer responsive to analysis of the application layer priority order, attributes of the AA devices, and the electronic map of relationships among the input and output units of the plurality of devices thereby to define a network layer priority order; and updating the network layer priority order responsive to analysis of the optimal network topologies thereby to improve the functioning of a computer associated with the plurality of devices.

12. The computer-implemented method as defined in claim 11, wherein establishing the priority order includes:

assigning a priority rank to each request message responsive to determination of one or more attributes of the respective request message and measurement of performance of the plurality of devices, the one or more attributes of the respective request message configured to include command type, command type configured to include one or more of the following: open loop, closed loop, cascaded loop, and protection and safety system loop;

assigning a higher priority rank to a first set of one or more request messages than to a second set of one or more request messages when each of the first set of request messages is associated with the AA devices and each of the second set of request messages is associated with the non-AA devices;

assigning a relatively high priority rank to a third set of one or more request messages when each of the third set of request messages has unique stringent time delay requirements; and assigning a fixed priority rank to a fourth set of one or more request messages when each of the fourth set of request messages is associated with a set of one or more of the AA devices.

13. The computer-implemented method as defined in claim 12, wherein each request message is associated with an objective, and wherein the method further includes:

updating the application layer priority order responsive to change in the network layer priority order;

invoking one or more alternative request messages to achieve the respective objectives of one or more of the request messages responsive to analysis of information related to critical network areas that cannot be reached and the optimal network topologies;

updating the network layer priority order responsive to receipt of an override priority from a second set of one or more of the plurality of devices;

determining whether each request message is validated; and updating an application run schedule responsive to update of the application layer priority order.

14. The computer-implemented method as defined in claim 13, wherein the method further includes restricting transition and dynamic changes of the set of one or more of the AA devices.

15. The computer-implemented method as defined in claim 11, wherein the method further includes:
   synchronizing one or more message timeslots associated with one or more of the request messages between two or more of the plurality of devices; and
   updating the application layer priority order responsive to synchronization of the one or more message timeslots.

16. The computer-implemented method as defined in claim 11, wherein the AA devices are configured to include one or more automation application controllers and one or more logic solvers, and wherein the method further includes:
   providing a front-end user logic execution interface; and
   setting one or more thresholds and one or more ranges for operations of the one or more logic solvers.

17. The computer-implemented method as defined in claim 11, wherein the method further includes recording the measured performance of the plurality of devices.

18. The computer-implemented method as defined in claim 10, wherein the AA devices include one or more of sensors, actuators, controllers, and logic solvers, and wherein the AA devices are related to one or more of hydrocarbon processes, power, utilities, factory operations, work cells, and intelligent controllers.

19. Non-transitory computer-readable medium having one or more computer programs stored therein operated by one or more processors to provide adaptive priority scheduling of communications over a communication network and dynamic resources allocation among a plurality of devices positioned in the communication network, the one or more computer programs comprising a set of instructions that, when executed by the one or more processors, cause the one or more processors to perform the operations of:
   configuring and provisioning relationships among input and output units of a plurality of devices positioned in a communication network, each of the plurality of devices configured to be in communication with another one or more of the plurality of devices through the communication network, each of the plurality of devices also configured to send and receive messages through a respective input and output unit, the plurality of devices configured to include a first subset of plurality of devices equipped with embedded intelligence thereby to define automation application (AA) devices, the plurality of devices also configured to include a second subset of plurality of devices that are not equipped with embedded intelligence thereby to define non-AA devices;
   controlling network resources allocation responsive to the configuration and provision of relationships among the input and output units of the plurality of devices;
   interfacing with each of the plurality of devices;
   measuring performance of the plurality of devices responsive to interface with each of the plurality of devices;
   analyzing performance of the plurality of devices responsive to measurement of performance of the plurality of devices;
   identifying optimal network topologies associated with the plurality of devices responsive to the analysis of performance of the plurality of devices; and
   controlling network resources allocation responsive to the configuration and provision of relationships among the input and output units of the plurality of devices, the control of network resources allocation, and the analysis of performance of the plurality of devices thereby to enhance coexistence of the AA devices and the non-AA devices within the communication network,
   wherein communication through the communication network includes communication among a plurality of layers, wherein the plurality of layers include a network logic control layer, an application logic control layer, and an input/output layer for each of the plurality of devices, and wherein the operations further include linking the application logic control layer and the network logic control layer thereby to provide dynamic priority allocation, scheduling, and behavior identification of request messages at the application logic control layer and further to map the request messages to the network logic control layer and to the respective input/output layer for each of the plurality of devices.

20. The non-transitory computer-readable medium having one or more computer programs stored therein as defined in claim 19, wherein the operations further include:
   converting relationships among the input and output units of the plurality of devices into an electronic map of relationships among the input and output units of the plurality of devices;
   establishing a priority order for execution of a plurality of application tasks associated with the plurality of devices, each of the plurality of application tasks associated with a request message;
   mapping the priority order to the application logic control layer responsive to establishment of the priority order thereby to define an application layer priority order;
   updating, at each of a plurality of cycles, the application layer priority order responsive to one or more application task function runs and further responsive to determination of per message uniqueness as a function of time;
   estimating predicted performance data related to the plurality of devices responsive to measurement of performance of the plurality of devices;
   identifying the optimal network topologies associated with the plurality of devices responsive to analysis of the measured performance of the plurality of devices and the predicted performance data;
   mapping the application layer priority order to the network logic control layer responsive to analysis of the application layer priority order, attributes of the AA devices, and the electronic map of relationships among the input and output units of the plurality of devices thereby to define a network layer priority order; and
   updating the network layer priority order responsive to analysis of the optimal network topologies thereby to improve the functioning of a computer associated with the plurality of devices.

21. The non-transitory computer-readable medium having one or more computer programs stored therein as defined in claim 20, wherein establishing the priority order includes:
   assigning a priority rank to each request message responsive to determination of one or more attributes of the respective request message and measurement of performance of the plurality of devices, the one or more attributes of the respective request message configured to include command type, command type configured to include one or more of the following: open loop, closed loop, cascaded loop, and protection and safety system loop;
   assigning a higher priority rank to a first set of one or more request messages than to a second set of one or more request messages when each of the first set of request messages is associated with the AA devices and each of the second set of request messages is associated with the non-AA devices;

assigning a relatively high priority rank to a third set of one or more request messages when each of the third set of request messages has unique stringent time delay requirements; and assigning a fixed priority rank to a fourth set of one or more request messages when each of the fourth set of request messages is associated with a set of one or more of the AA devices.

22. The non-transitory computer-readable medium having one or more computer programs stored therein as defined in claim 21, wherein each request message is associated with an objective, and wherein the operations further include:

updating the application layer priority order responsive to change in the network layer priority order;

invoking one or more alternative request messages to achieve the respective objectives of one or more of the request messages responsive to analysis of information related to critical network areas that cannot be reached and the optimal network topologies;

updating the network layer priority order responsive to receipt of an override priority from a second set of one or more of the plurality of devices;

determining whether each request message is validated; and updating an application run schedule responsive to update of the application layer priority order.

23. The non-transitory computer-readable medium having one or more computer programs stored therein as defined in claim 22, wherein the operations further include restricting transition and dynamic changes of the set of one or more of the AA devices.

24. The non-transitory computer-readable medium having one or more computer programs stored therein as defined in claim 20, wherein the operations further include:

synchronizing one or more message timeslots associated with one or more of the request messages between two or more of the plurality of devices; and updating the application layer priority order responsive to synchronization of the one or more message timeslots.

25. The non-transitory computer-readable medium having one or more computer programs stored therein as defined in claim 20, wherein the AA devices are configured to include one or more automation application controllers and one or more logic solvers, and wherein the operations further include:

providing a front-end user logic execution interface; and setting one or more thresholds and one or more ranges for operations of the one or more logic solvers.

26. The non-transitory computer-readable medium having one or more computer programs stored therein as defined in claim 20, wherein the operations further include recording the measured performance of the plurality of devices.

27. The non-transitory computer-readable medium having one or more computer programs stored therein as defined in claim 19, wherein the AA devices include one or more of sensors, actuators, controllers, and logic solvers, and wherein the AA devices are related to one or more of hydrocarbon processes, power, utilities, factory operations, work cells, and intelligent controllers.

* * * * *